(12) United States Patent
Gaikwad

(10) Patent No.: US 7,346,129 B2
(45) Date of Patent: Mar. 18, 2008

(54) PAYLOAD BASED CHANNEL ESTIMATION OF A WIRELESS CHANNEL

(75) Inventor: Rohit V. Gaikwad, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 697 days.

(21) Appl. No.: 10/856,080

(22) Filed: May 28, 2004

(65) Prior Publication Data

US 2005/0185738 A1 Aug. 25, 2005

Related U.S. Application Data

(60) Provisional application No. 60/547,477, filed on Feb. 25, 2004.

(51) Int. Cl.
*H03D 1/00* (2006.01)
(52) U.S. Cl. ..................................................... 375/340
(58) Field of Classification Search ................. 375/340
See application file for complete search history.

(56) References Cited

U.S. PATENT DOCUMENTS

| 6,487,690 | B1 * | 11/2002 | Schuster et al. ............ 714/752 |
| 7,039,004 | B2 * | 5/2006 | Sun et al. .................... 370/208 |
| 2003/0224787 | A1 * | 12/2003 | Gandolfo ..................... 455/434 |
| 2004/0085917 | A1 * | 5/2004 | Fitton et al. ................. 370/292 |
| 2005/0180310 | A1 * | 8/2005 | Mueller et al. ............. 370/204 |
| 2005/0190800 | A1 * | 9/2005 | Maltsev et al. ............. 370/914 |
| 2006/0114981 | A1 * | 6/2006 | Ghosh et al. ............... 375/232 |
| 2006/0274820 | A1 * | 12/2006 | Walton et al. .............. 375/148 |
| 2006/0274844 | A1 * | 12/2006 | Walton et al. .............. 375/260 |

* cited by examiner

*Primary Examiner*—David C. Payne
*Assistant Examiner*—Leon-Viet Q Nguyen
(74) *Attorney, Agent, or Firm*—Garlick, Harrison & Markison; Timothy W. Markison; JessicA W. Smith

(57) ABSTRACT

A method for payload-based channel estimation of a wireless channel begins by receiving a frame via the wireless communication channel. The frame includes a training sequence, a frame information section, and a plurality of time sequential data payload sections. As the frame is being received, the method continues by determining a channel estimation based on the training sequence. The method continues as the frame is being received by determining a channel estimation of a data payload section of the plurality of time sequential data payload sections to produce a payload channel estimation. The method continues as the frame is being received by updating the channel estimation based on the payload channel estimation to produce an updated channel estimation.

34 Claims, 14 Drawing Sheets

RF receiver 76 - 80 baseband processing module 64 of FIG 3

FIG. 7 baseband processing module 64 of FIG 3 baseband processing
module 64 of Figure 2 proximal area with only 802.11n devices proximal area w/802.11n & 802.11a &/or 802.11g devices proximal area includes 802.11n & 802.11a, .11b &/or .11g devices

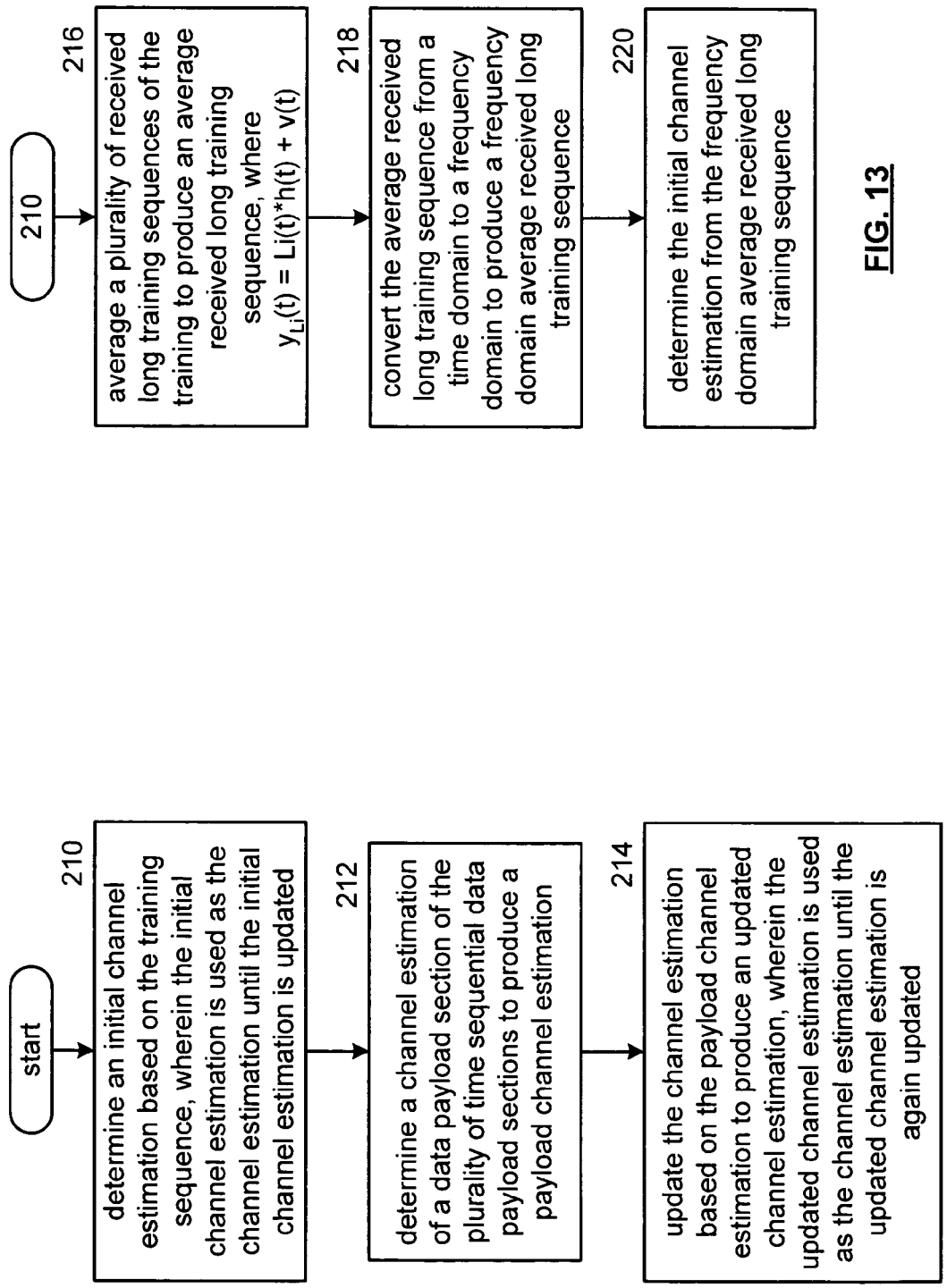

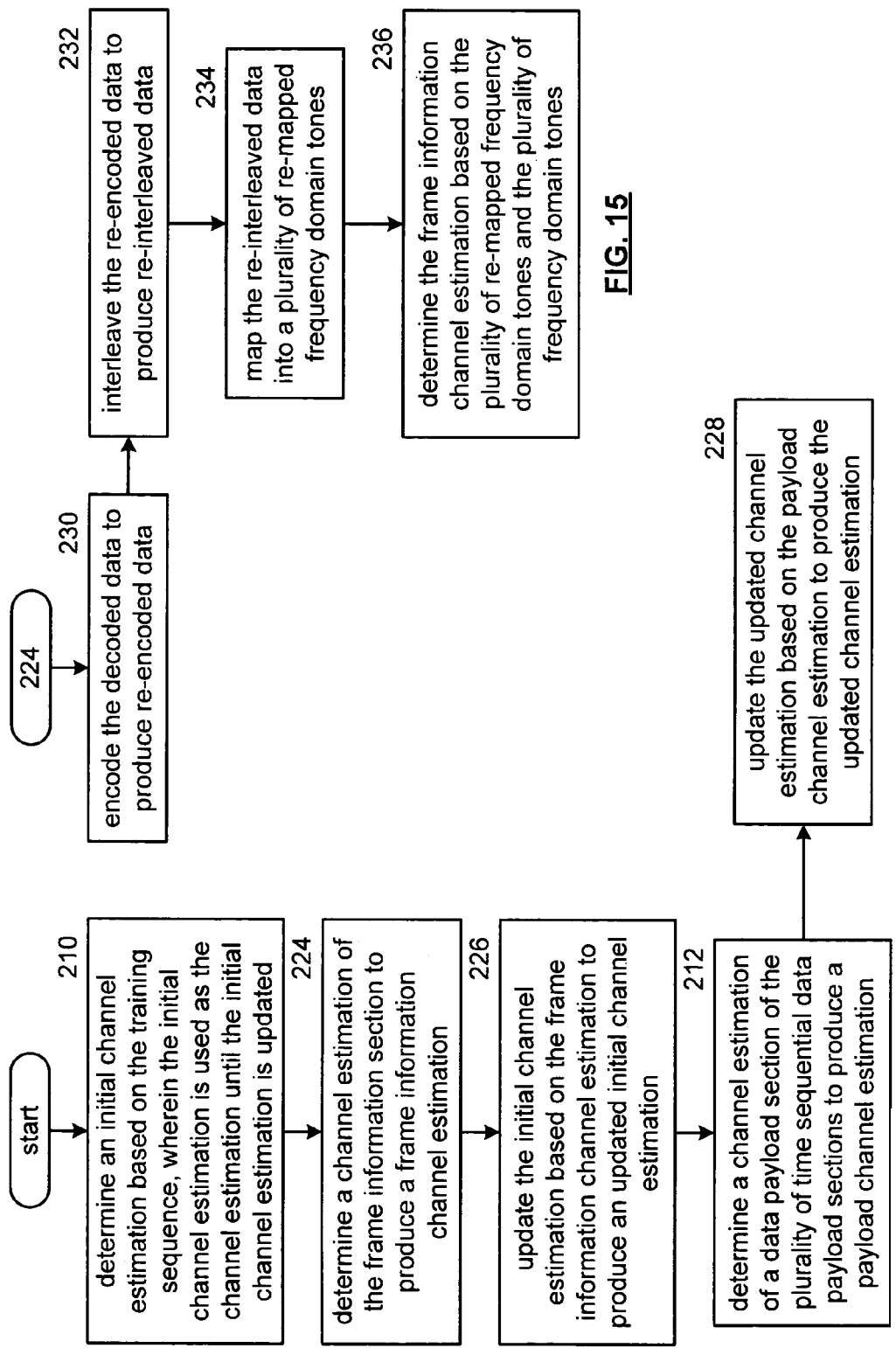

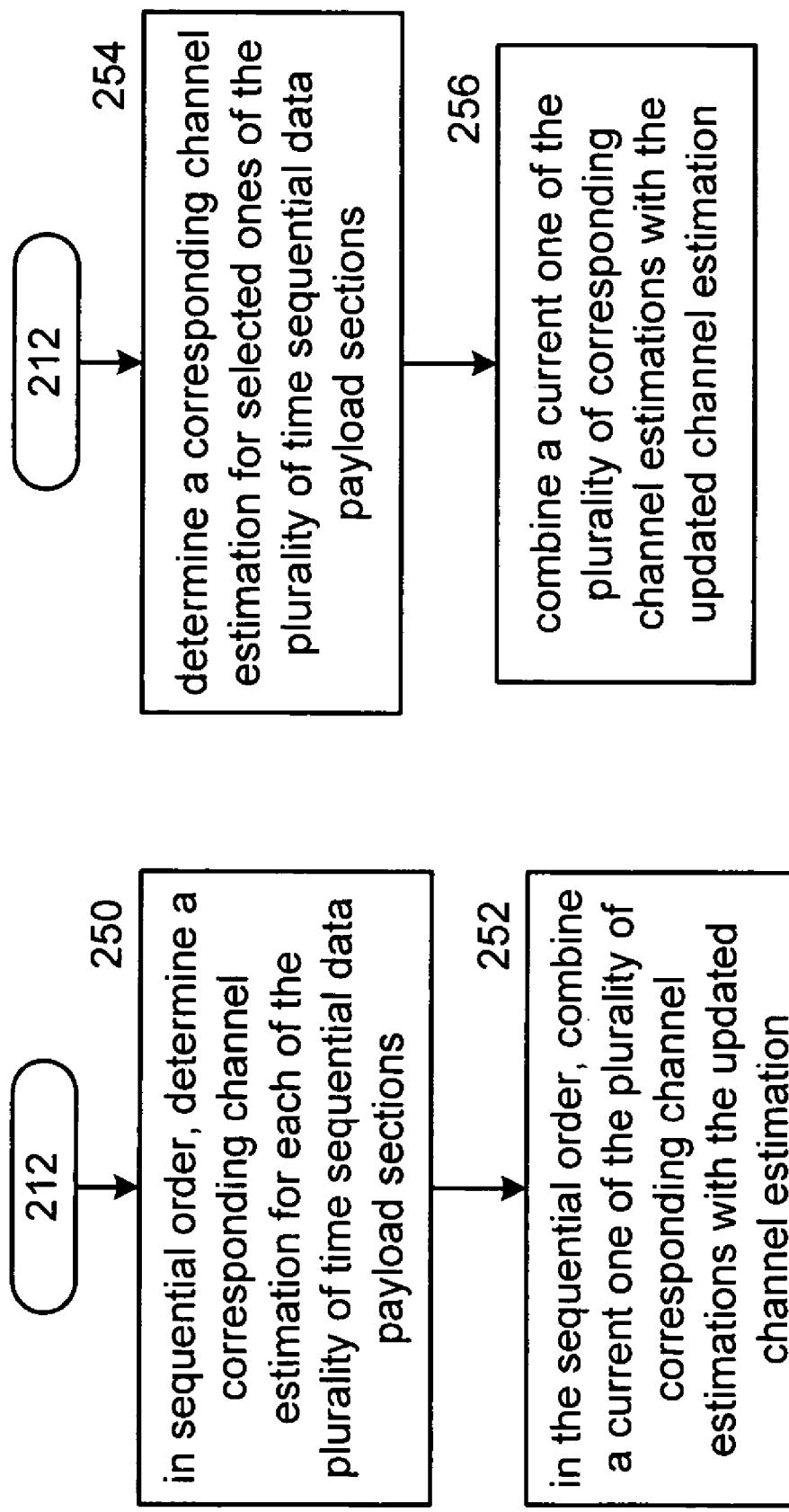

PAYLOAD BASED CHANNEL ESTIMATION OF A WIRELESS CHANNEL

This invention is claiming priority under 35 USC § 119(e) to a provisionally filed patent application having the same title as the present patent application, a filing date of Feb. 25, 2004, and a Ser. No. of 60/547,477.

BACKGROUND OF THE INVENTION

1. Technical Field of the Invention

This invention relates generally to wireless communication systems and more particularly to estimating channel response of a wireless channel within a wireless communication system.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is further known, the data recovery stage performs numerous operations to recover data from the filtered signals. Such operations include, for an IEEE 802.11a or IEEE 802.11g compliant receiver, guard interval removal, fast Fourier transform, de-mapping and slicing, de-interleaving, and decoding. The decoding utilizes a channel estimation to produce the recovered data from de-interleaved data. In accordance with the IEEE 802.11a and/or IEEE 802.11g standard, a frame includes a short training sequence (STS), a long training sequence (LTS), a signal field, and a plurality of data fields. The IEEE 802.11a and/or IEEE 802.11g standard further indicates that channel estimation is to be done during the long training sequence. Once the channel estimation is determined, it is used for the remainder of the frame.

In many applications, such a channel estimation procedure results in an adequate channel estimation for the entire frame, since the wireless channel transfer characteristics do not rapidly change with respect to the duration of the frame. In some applications, however, the transfer characteristics of a wireless channel may change during the transmission of the frame due to a change in the multi-path channel between the transmitter and the receiver. If the change is of a non-trivial nature, the change can adversely affect the receiver's ability to accurately recover the data being transmitting in the frame.

Therefore, a need exists for a method and apparatus for updating a channel estimation of a wireless channel during the transmission of a frame.

BRIEF SUMMARY OF THE INVENTION

The payload based channel estimation of a wireless channel of the present invention substantially meets these needs and others. In one embodiment, a method for payload-based channel estimation of a wireless channel begins by receiving a frame via the wireless communication channel. The frame includes a training sequence, a frame information section, and a plurality of time sequential data payload sections, wherein, in time, the training sequence precedes at least a portion of the frame information section and the frame information section precedes the plurality of time sequential data payload sections. As the frame is being received, the method continues by determining a channel estimation based on the training sequence. The method continues as the frame is being received by determining a channel estimation of a data payload section of the plurality of time sequential data payload sections to produce a payload channel estimation. The method continues as the frame is being received by updating the channel estimation based on the payload channel estimation to produce an updated channel estimation.

In another embodiment, a wireless local area network (WLAN) receiver includes a radio frequency (RF) receiver section, a baseband processing module, and a channel estimation module. The RF receiver section is operably to convert inbound RF signals into time domain baseband signals, wherein the inbound RF signals represent at least one frame. The frame includes a training sequence, a frame information section, and a plurality of time sequential data payload sections, wherein, in time, the training sequence precedes at least a portion of the frame information section and the frame information section precedes the plurality of time sequential data payload sections. The baseband processing module is operably coupled to convert the time domain baseband signals into decoded data based on a channel estimation. The channel estimation module operably coupled to, as the frame is being received, determine an initial channel estimation based on the training sequence, wherein for the baseband processing module utilizes the initial channel estimation as the channel estimation until the initial channel estimation is updated; determine a channel estimation of a data payload section of the plurality of time sequential data payload sections to produce a payload channel estimation; and update the channel estimation based on the payload channel estimation to produce an updated channel estimation, wherein for the baseband processing module utilizes the updated channel estimation as the channel estimation until the updated channel estimation is again updated.

BRIEF DESCRIPTION OF THE SEVERAL VIEWS OF THE DRAWINGS

FIG. 12 is a logic diagram of a method for payload based channel estimation of a wireless channel in accordance with the present invention;

FIG. 13 is a logic diagram of a method of determining an initial channel estimation of the method of FIG. 12;

FIG. 14 is a logic diagram of another method for payload based channel estimation of a wireless channel in accordance with the present invention;

FIG. 15 is a logic diagram of a method of determining a channel estimation of frame information or payload data in accordance with the method of FIG. 14;

FIG. 18 is a logic diagram of a method of determining the channel estimation of the data payload section in accordance with the method of FIGS. 12 and 14; and FIG. 19 is a logic diagram of another method of determining the channel estimation of the data payload section in accordance with the method of FIGS. 12 and 14.

DETAILED DESCRIPTION OF THE INVENTION

Figure 1:
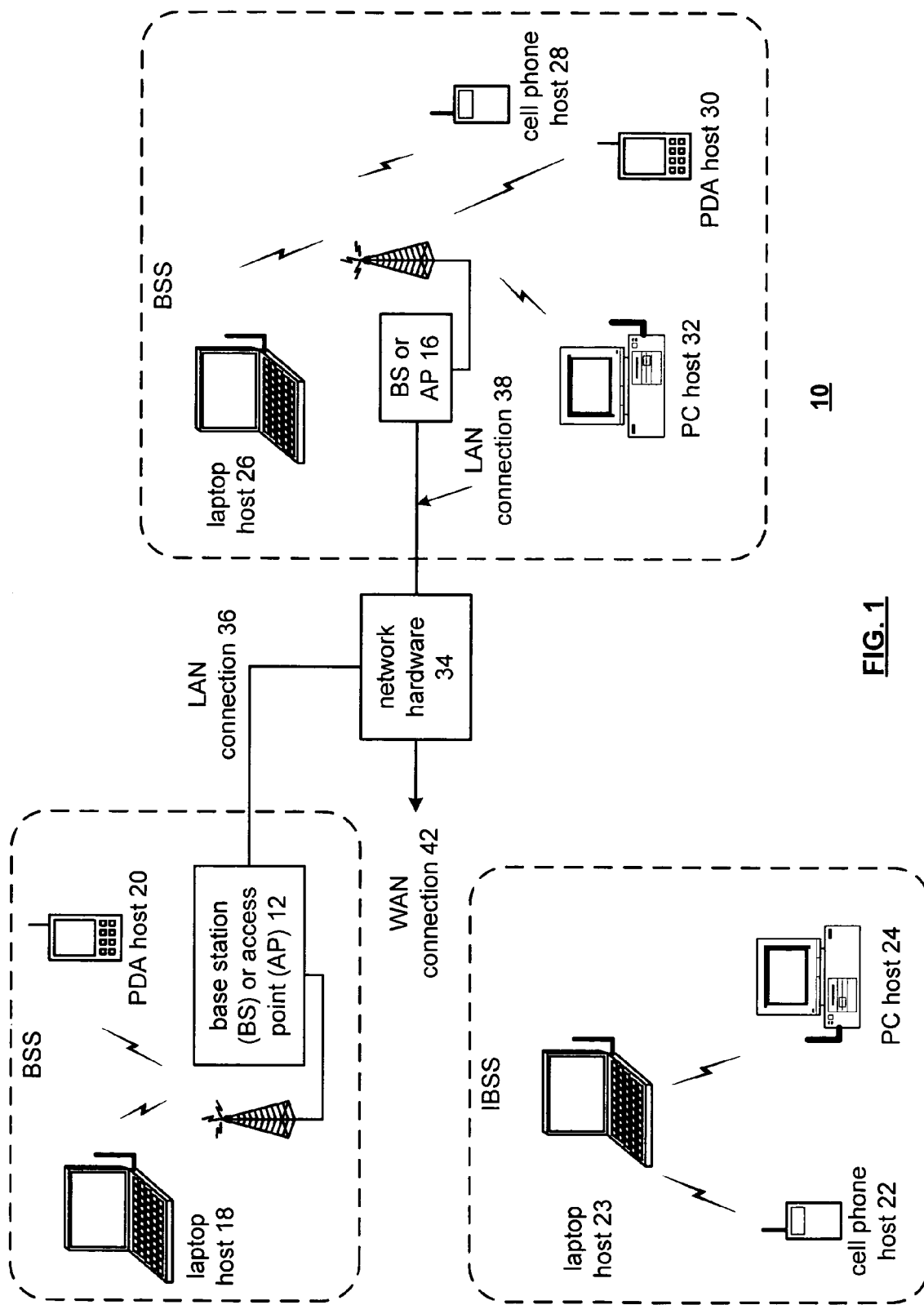
FIG. 1 is a schematic block diagram of a wireless communication system in accordance with the present invention.

FIG. 1 is a schematic block diagram illustrating a communication system 10 that includes a plurality of base stations and/or access points 12 and 16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of at least some of the wireless communication devices will be described in greater detail with reference to FIG. 2.

The base stations or access points 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12 and 16 has an associated antenna or antenna array to communicate with the wireless communication devices in its regional area, which is generally referred to as a basic service set (BSS). Typically, the wireless communication devices register with a particular base station or access point 12 or 16 to receive services from the communication system 10.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Wireless communication devices 22, 23, and 24 are located in an area of the wireless communication system 10 where they are not affiliated with an access point. In this region, which is generally referred to as an independent basic service set (IBSS), the wireless communication devices communicate directly (i.e., point-to-point or point-to-multiple point), via an allocated channel to produce an ad-hoc network.

Figure 2:
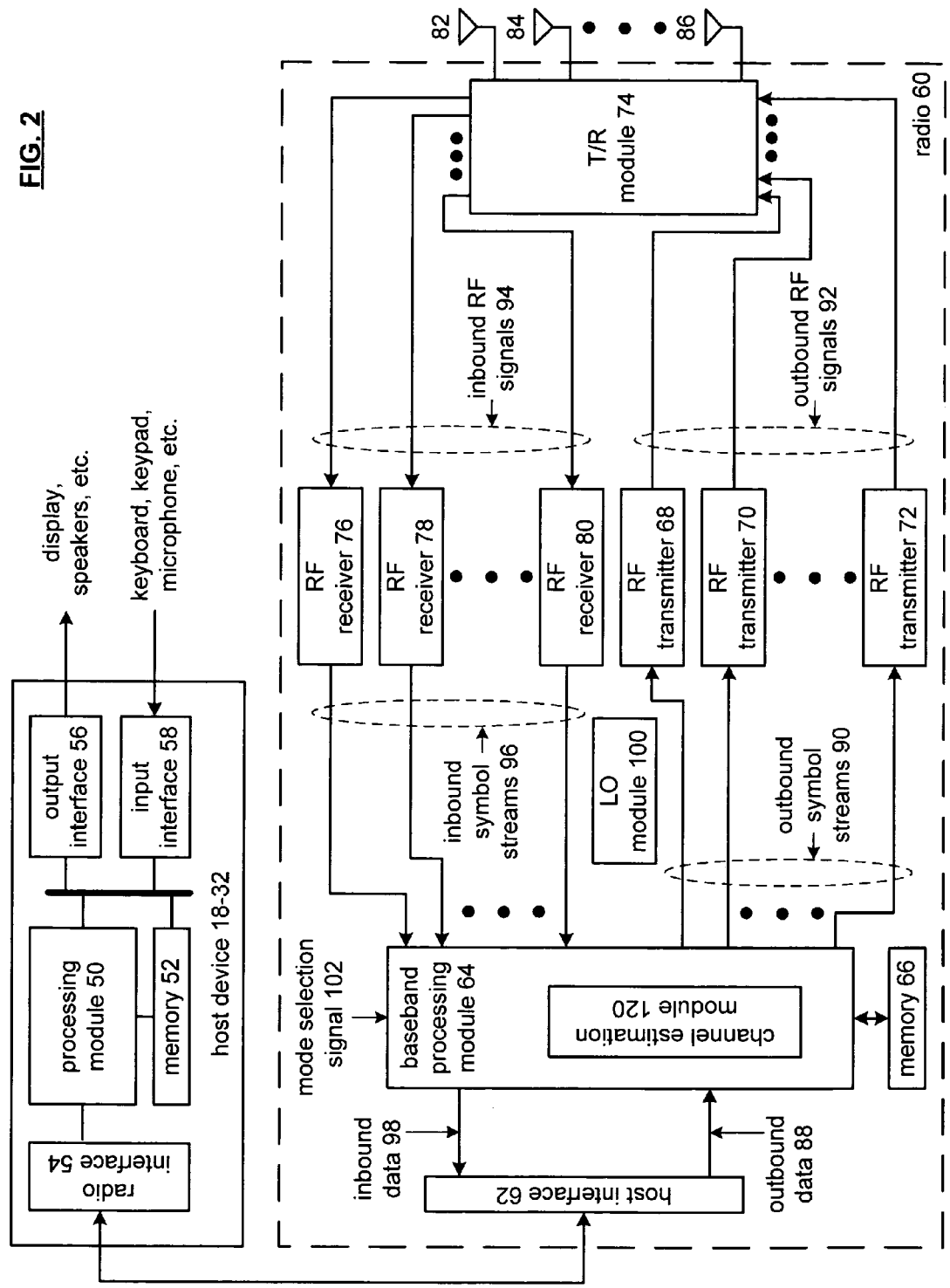
FIG. 2 is a schematic block diagram of a wireless communication device in accordance with the present invention.

FIG. 2 is a schematic block diagram illustrating a wireless communication device that includes the host device 18-32 and an associated radio, or station, 60. For cellular telephone hosts, the radio 60 is a built-in component. For personal digital assistants hosts, laptop hosts, and/or personal computer hosts, the radio 60 may be built-in or an externally coupled component. In this embodiment, the station may be compliant with one of a plurality of wireless local area network (WLAN) protocols including, but not limited to, IEEE 802.11n.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio, or station, 60 includes a host interface 62, a baseband processing module 64, memory 66, a plurality of radio frequency (RF) transmitters 68-72, a transmit/receive (T/R) module 74, a plurality of antennas 82-86, a plurality of RF receivers 76-80, and a local oscillation module 100. The baseband processing module 64, in combination with operational instructions stored in memory 66, execute digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables, which appear at the end of the detailed discussion. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM.

The baseband processing module 64, based on the mode selection signal 102 produces the one or more outbound symbol streams 90 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennas, the baseband processing module 64 will produce 2, 3 or 4 outbound symbol streams 90 corresponding to the number of antennas from the output data 88.

Depending on the number of outbound streams 90 produced by the baseband module 64, a corresponding number of the RF transmitters 68-72 will be enabled to convert the outbound symbol streams 90 into outbound RF signals 92. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennas 82-86. The T/R module 74 provides the inbound RF signals 94 to one or more RF receivers 76-80. The RF receiver 76-80, which will be described in greater detail with reference to FIG. 4, converts the inbound RF signals 94 into a corresponding number of inbound symbol streams 96. The number of inbound symbol streams 96 will correspond to the particular mode in which the data was received. The baseband processing module 60 receives the inbound symbol streams 90 and converts them into inbound data 98, which is provided to the host device 18-32 via the host interface 62. For a further discussion of an implementation of the radio, or station, 60 refer to co-pending patent application entitled WLAN TRANSMITTER HAVING HIGH DATA THROUGHPUT, having an attorney docket number of BP 3516, and a provisional filing date of Feb. 19, 2004 and co-pending patent application entitled WLAN RECEIVER HAVING AN ITERATIVE DECODER, having an attorney docket number of BP 3529 and a provisional filing date of Feb. 19, 2004.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennas 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
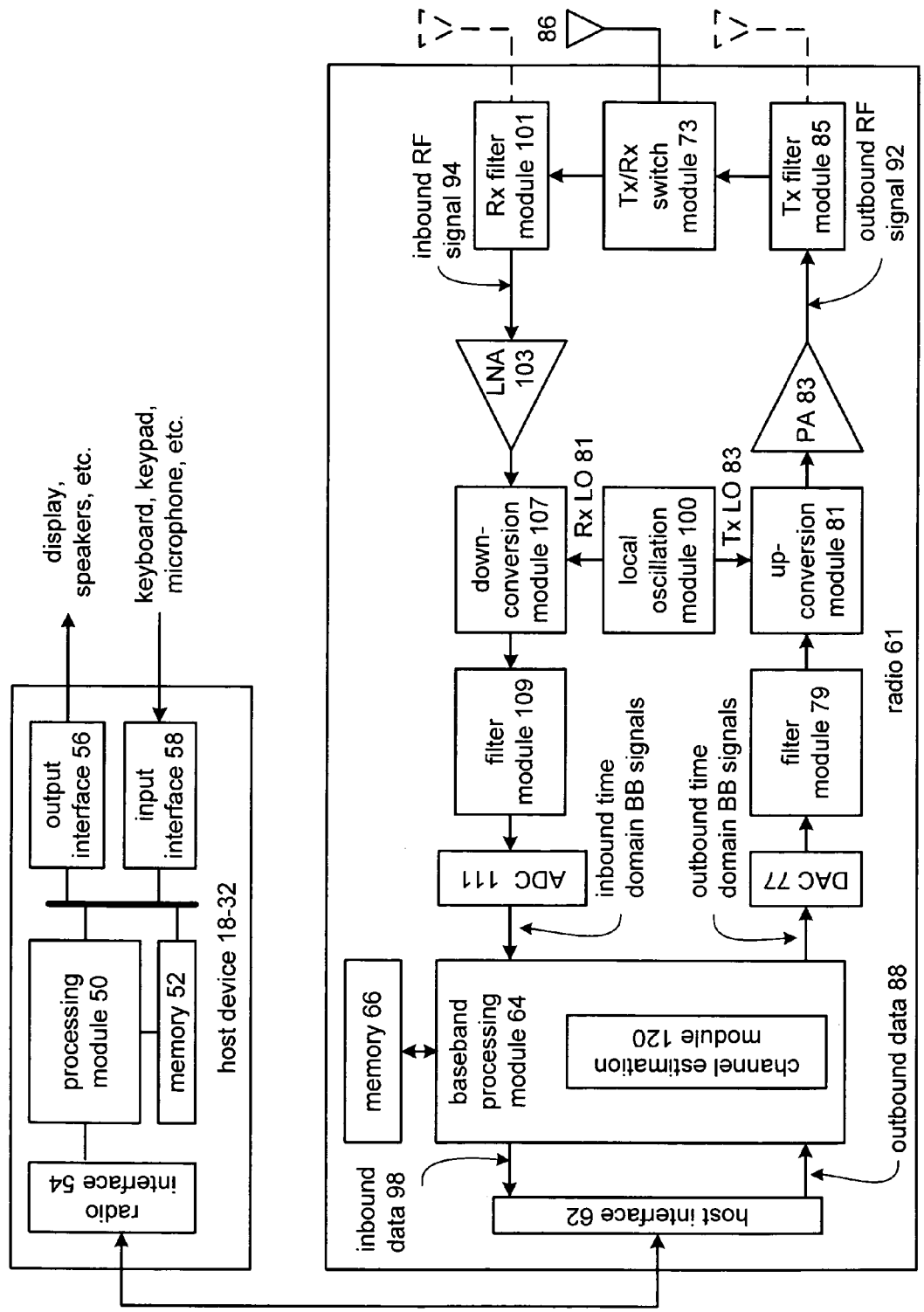
FIG. 3 is a schematic block diagram of a wireless communication device in accordance with the present invention.

FIG. 3 is a schematic block diagram illustrating a wireless communication device that includes the host device 18-32 and an associated radio 61. For cellular telephone hosts, the radio 61 is a built-in component. For personal digital assistants hosts, laptop hosts, and/or personal computer hosts, the radio 61 may be built-in or an externally coupled component. The host device 18-32 operates as discussed above with reference to FIG. 2.

Radio 61 includes a host interface 62, baseband processing module 64, an analog-to-digital converter 111, a filter module 109, an IF mixing down conversion stage 107, a receiver filter 101, a low noise amplifier 103, a transmitter/receiver switch 73, a local oscillation module 74, memory 66, a digital transmitter processing module 76, a digital-to-analog converter 78, a filter module 79, an IF mixing up conversion stage 81, a power amplifier 83, a transmitter filter module 85, and an antenna 86. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant. The baseband processing module 64 functions as described above and performs one or more of the functions illustrated in FIGS. 5-19.

In operation, the radio 61 receives outbound data 88 from the host device via the host interface 62. The host interface 62 routes the outbound data 88 to the baseband processing module 64, which processes the outbound data 88 in accordance with a particular wireless communication standard (e.g., IEEE 802.11 Bluetooth, et cetera) to produce outbound time domain baseband (BB) signals.

The digital-to-analog converter 77 converts the outbound time domain baseband signals from the digital domain to the analog domain. The filtering module 79 filters the analog signals prior to providing them to the IF up-conversion module 81. The IF up conversion module 81 converts the analog baseband or low IF signals into RF signals based on a transmitter local oscillation 83 provided by local oscillation module 100. The power amplifier 83 amplifies the RF signals to produce outbound RF signals 92, which are filtered by the transmitter filter module 85. The antenna 86 transmits the outbound RF signals 92 to a targeted device such as a base station, an access point and/or another wireless communication device.

The radio 61 also receives inbound RF signals 94 via the antenna 86, which were transmitted by a base station, an access point, or another wireless communication device. The antenna 86 provides the inbound RF signals 94 to the receiver filter module 101 via the Tx/Rx switch 73. The Rx filter 71 bandpass filters the inbound RF signals 94 and provides the filtered RF signals to the low noise amplifier 103, which amplifies the RF signals 94 to produce amplified inbound RF signals. The low noise amplifier 72 provides the amplified inbound RF signals to the IF down conversion module 107, which directly converts the amplified inbound RF signals into inbound low IF signals or baseband signals based on a receiver local oscillation 81 provided by local oscillation module 100. The down conversion module 70 provides the inbound low IF signal or baseband signal to the filtering/gain module 68. The filtering module 109 filters the inbound low IF signals or the inbound baseband signals to produce filtered inbound signals.

The analog-to-digital converter 111 converts the filtered inbound signals into inbound time domain baseband signals.

The baseband processing module 64 decodes, descrambles, demaps, and/or demodulates the inbound time domain baseband signals to recapture inbound data 98 in accordance with the particular wireless communication standard being implemented by radio 61. The host interface 62 provides the recaptured inbound data 92 to the host device 18-32 via the radio interface 54.

As one of average skill in the art will appreciate, the wireless communication device of FIG. 3 may be implemented using one or more integrated circuits. For example, the host device may be implemented on one integrated circuit, the baseband processing module 64 and memory 66 may be implemented on a second integrated circuit, and the remaining components of the radio 61, less the antenna 86, may be implemented on a third integrated circuit. As an alternate example, the radio 61 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 4:
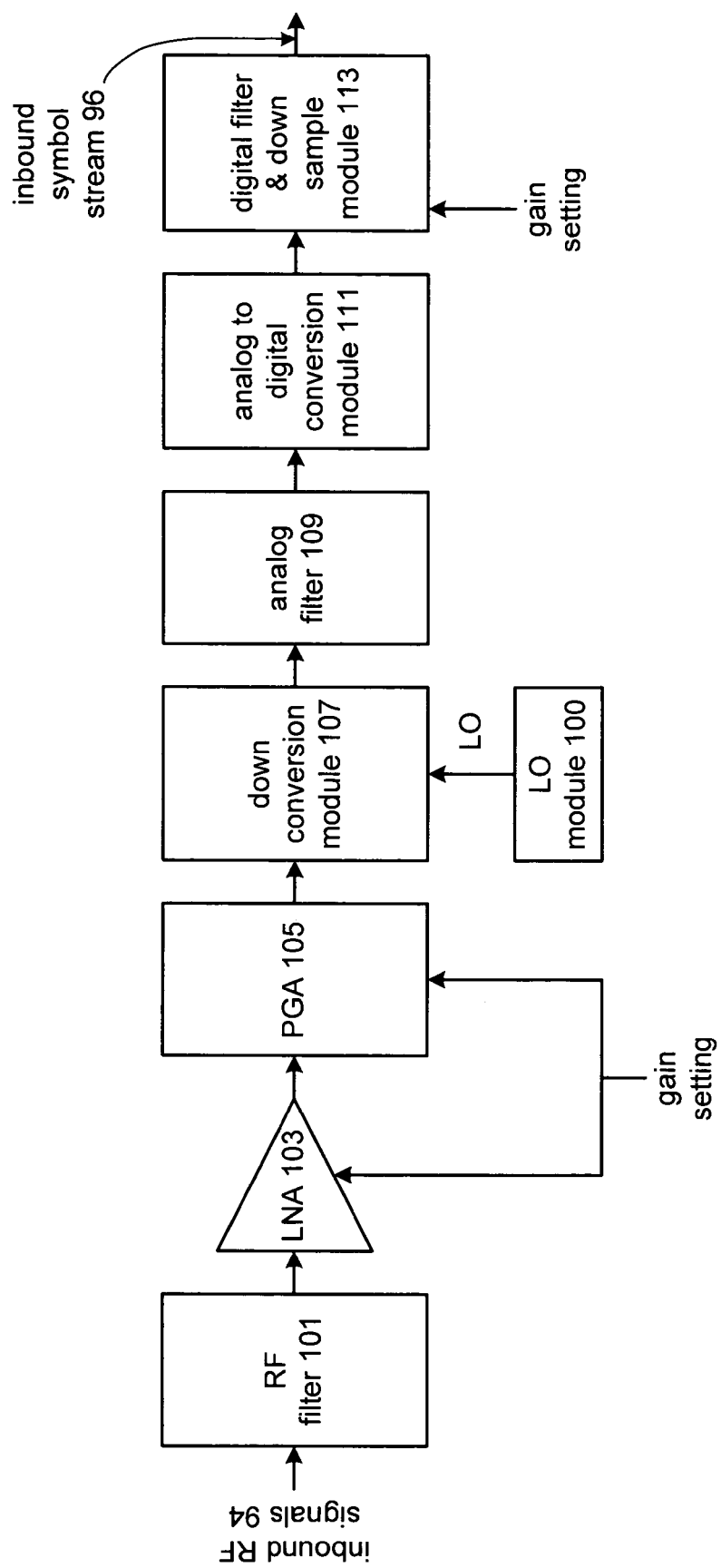
FIG. 4 is a schematic block diagram of a receiver section of the wireless communication device of FIG. 2 in accordance with the present invention.

FIG. 4 is a schematic block diagram of each of the RF receivers 76-80. In this embodiment, each of the RF receivers 76-80 includes an RF filter 101, a low noise amplifier (LNA) 103, a programmable gain amplifier (PGA) 105, a down-conversion module 107, an analog filter 109, an analog-to-digital conversion module 111 and a digital filter and down-sampling module 113. The RF filter 101, which may be a high frequency band-pass filter, receives the inbound RF signals 94 and filters them to produce filtered inbound RF signals. The low noise amplifier 103 amplifies the filtered inbound RF signals 94 based on a gain setting and provides the amplified signals to the programmable gain amplifier 105. The programmable gain amplifier further amplifies the inbound RF signals 94 before providing them to the down-conversion module 107.

The down-conversion module 107 includes a pair of mixers, a summation module, and a filter to mix the inbound RF signals with a local oscillation (LO) that is provided by the local oscillation module to produce analog baseband signals. The analog filter 109 filters the analog baseband signals and provides them to the analog-to-digital conversion module 111 which converts them into a digital signal. The digital filter and down-sampling module 113 filters the digital signals and then adjusts the sampling rate to produce the inbound symbol stream 96.

Figure 5:
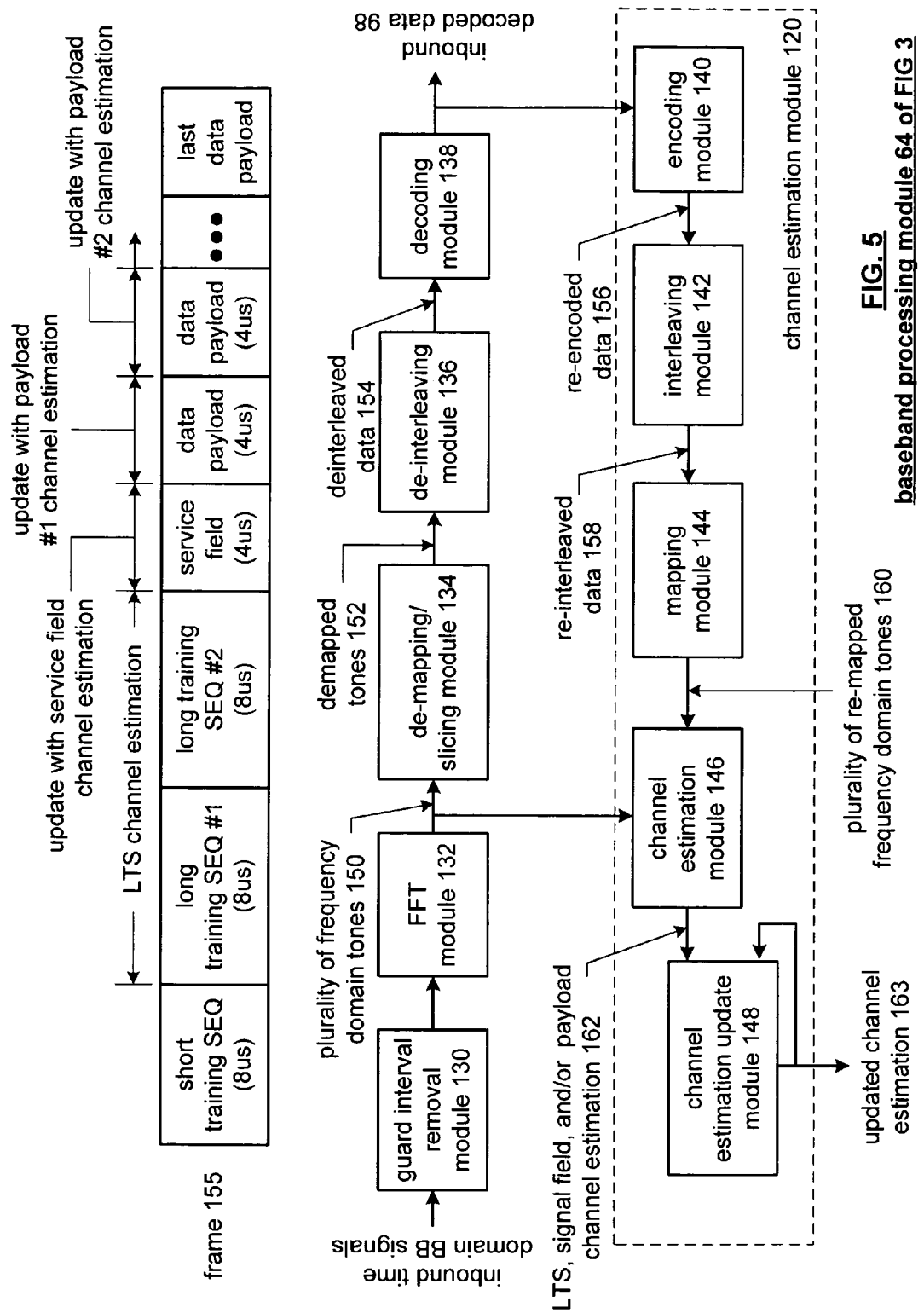
FIG. 5 is a schematic block diagram of an embodiment of a baseband processing module of the wireless communication device of FIG. 3 in accordance with the present invention.

FIG. 5 is a functional schematic block diagram of an implementation of the baseband processing module 64 of FIG. 3. In this embodiment, the baseband processing module 64 is implemented to include a guard interval removal module 130, a fast Fourier transform (FFT) module 132, a demapping/slicing module 134, a deinterleaving module 136, a decoding module 138, and the channel estimation module 120. In this embodiment, the channel estimation module 120 includes an encoding module 140, an interleaving module 142, a mapping module 144, a channel estimation module 146, and a channel estimation update module 148. As is further shown, a frame 155, which may in accordance with IEEE 802.11a and/or IEEE 802.11.g, includes a short training sequence, two long training sequences, a service field, and a plurality of data payload sections.

The baseband processing module 64 processes the sections of frame 155 sequentially. As is known, the baseband processing module 64 processes the short training sequence to recognize the presence of a frame to begin the determination of whether the frame is valid, and to establish initial gain settings of the radio receiver section (e.g., the LNA gain, programmable gain amplifier gain, analog-to-digital gain, et cetera).

The baseband processing module 64 then processes the long training sequences to further establish the validity of frame 155 and via the guard interval removal module 130 to remove the guard intervals that separate the long training sequences. The fast Fourier transform module 132 converts the time domain signals representing the long training sequences into a plurality of time domain tones 150. The demapping/slicing module 134 demaps the plurality of frequency domain tones 150 to produce demapped tones 152. The interleaving module 136 deinterleaves the demapped tones 152 to produce deinterleaved data 154. The decoding module 138 decodes the deinterleaved data 154 to produce inbound decoded data 98.

For example, if the baseband processing module 64 is configured to be compliant with IEEE 802.11a and/or 802.11g, the inbound time domain baseband signals are orthogonal frequency division multiplexed (OFDM) modulated signals in the 5 GHz frequency band and/or the 2.4 GHz frequency band. The FFT module 132 converts the time domain signals into a plurality of frequency domain tones. Each of the frequency domain tones represents a sub-carrier of a channel. As is known, in the 802.11a and/or 802.11g standard, there are 48 data sub-carriers and 4 pilot sub-carriers for a total of 52 non-zero sub-carriers of a channel. The remaining 12 sub-carriers of the channel are zero to provide at least a portion of the guard interval. Each tone represents a modulated data that is in accordance with one of PBSK, QPSK, 16 QAM and/or 64 QAM. The demapping determines the particular symbol vector for the corresponding tone which is subsequently deinterleaved via the deinterleave module 136. The decoding module 138, which may be a VITERBI decoder, receives the symbol vectors representing the modulated data and decodes them accordingly to recapture the bits represented by the constellation mapped symbols.

The channel estimation module 120 essentially replicates the baseband transmit function to produce the re-mapped frequency domain tones from decoded data produced by the decoding module 138. As shown, the encoding module 140, which may be a convolutional encoder using rate 1/2, encodes the inbound decoded data bits 98 to produce re-encoded data 156. The encoding module 140 essentially is performing the inverse of the decoding module 138 and is performing the same encoding function that the transmitting wireless communication device used to encode the data that it transmitted to this particular receiver.

The interleaving module 142 interleaves the re-encoded data 156 to produce reinterleaved data 158. The mapping module 144 maps the reinterleaved data 158 to a plurality of remapped frequency domain tones 160. These functions are the inverse, or compliment, of the functions performed by the demapping/slicing module 134 and the deinterleaving module 136.

The channel estimation module 146 utilizes the plurality of remapped frequency domain tones 160 and the plurality of frequency domain tones 150 to produce a channel estimation 162 for the particular portion of the frame being processed. Accordingly, a channel estimation 162 may be produced for the long training sequences yielding an LTS channel estimation, may be performed for the service field, which generally may be referred to as frame information section, to produce a service field channel estimation, and one or more of the data payloads may have a channel estimation 160 determined therefore.

The channel estimation update module 148 receives the channel estimation 162 for the particular section of frame 155 and updates a previous channel estimation to produce an updated channel estimation 163. As one of average skill in the art will appreciate, the LTS channel estimation may be derived in accordance with prior art channel estimations in wireless LAN receivers that were 802.11a and/or 802.11g compliant.

With reference to frame 155, the channel estimation module 120 generates an initial channel estimation for the frame based on the LTS channel estimation. As the service field is being received, the channel estimation module 120 generates a service field channel estimation for the service field. The channel estimation module 120 then updates the channel estimation 163 for the frame based on the initial channel estimation and the newly determined service field channel estimation. When the $1^{st}$ data payload is received, the channel estimation module 120 generates a corresponding channel estimation for this data payload. The previously updated channel estimation is then updated with the $1^{st}$ payload channel estimation. The channel estimation module 120 may determine a corresponding channel estimation for each data payload received and update the current channel estimation 163 accordingly. Alternatively, the channel estimation module 120 may only utilize a set of the data payload sections to determine the updating of the channel estimation 163. Which data payloads to use may be predetermined (for example, use every $4^{th}$ data payload) or may be based on power of the corresponding data payload where the energy level needs to exceed a threshold to be used for an updating of the channel estimation.

As an example of the operational of the channel estimation module 146 and the channel estimation update module 148, let the received FFT output on the $K^{th}$ tone be:

$$Y_k = Z_k H_k + V_k$$

Dropping the subscript k for any tone, the equation can be rewritten as:

$$Y = ZH + V \approx CN(0, \sigma^2)$$

where Y is the received frame information section and/or received payload section, H is the corresponding channel estimation, V represents a noise component of the received frame information section and/or the received payload section, and Z represents the plurality of remapped frequency dome tones of the received frame information section and/or received payload section, where Z can be expressed as: $Z = K_{MOD} X$ therefore:

$$Y = (Z_i + jZq)(Hi + jHq) + (Vi + jVq)$$
$$= (Z_i Hi - ZqHq) + j(ZqHi + ZiHq) + (Vi + jVq)$$

therefore:

$$Yi = ZiHi - ZqHq + Vi$$
$$Yq = ZqHi + ZiHq + Vq$$

therefore:

$$ZiYi + ZqVq = (Zi^2 + Zq^2)Hi + ZiVi + ZqVq,$$

as such the channel estimation may be expressed as:

$$\hat{H}_{DNi} = \hat{H}_i = \frac{Z_i Y_i + Z_q V_q}{Z_i^2 + Z_q^2}$$

$$\hat{H}_i = H_i + \frac{Z_i V_i + Z_q V_q}{Z_i^2 + Z_q^2}$$

$$= \frac{Z_i^2 \sigma^2 + Z_q^2 \sigma^2}{(Z_i^2 + Z_q^2)^2}$$

$$= \frac{\sigma^2}{(Z_i^2 + Z_q^2)^2}$$

$$= \frac{\sigma^2}{K_{MOD}^2 (X_i^2 + X_q^2)}$$

As a further example, constellation points with high energy may be used to minimize estimation noise. For instance, consider 64 QAM, where $$K_{mod} = \frac{1}{42}$$

$$\frac{\sigma^2}{K_{MOD}^2 (X_i^2 + X_q^2)} = \frac{42\sigma^2}{(X_i^2 + X_q^2)}$$

From this example, channel estimation updates are done only when the constellation energy is greater than 42. Given this premise, the following constellation coordinates would give such an energy level:

| $(X_i, X_q)$ | $X_i^2 + X_q^2$ |
|---|---|
| I1, I7 | 50 |
| I3, I7 | 58 |
| I5, I7 | 74 |
| I7, I7 | 98 |
| I5, I5 | 50 |

Figure 6:
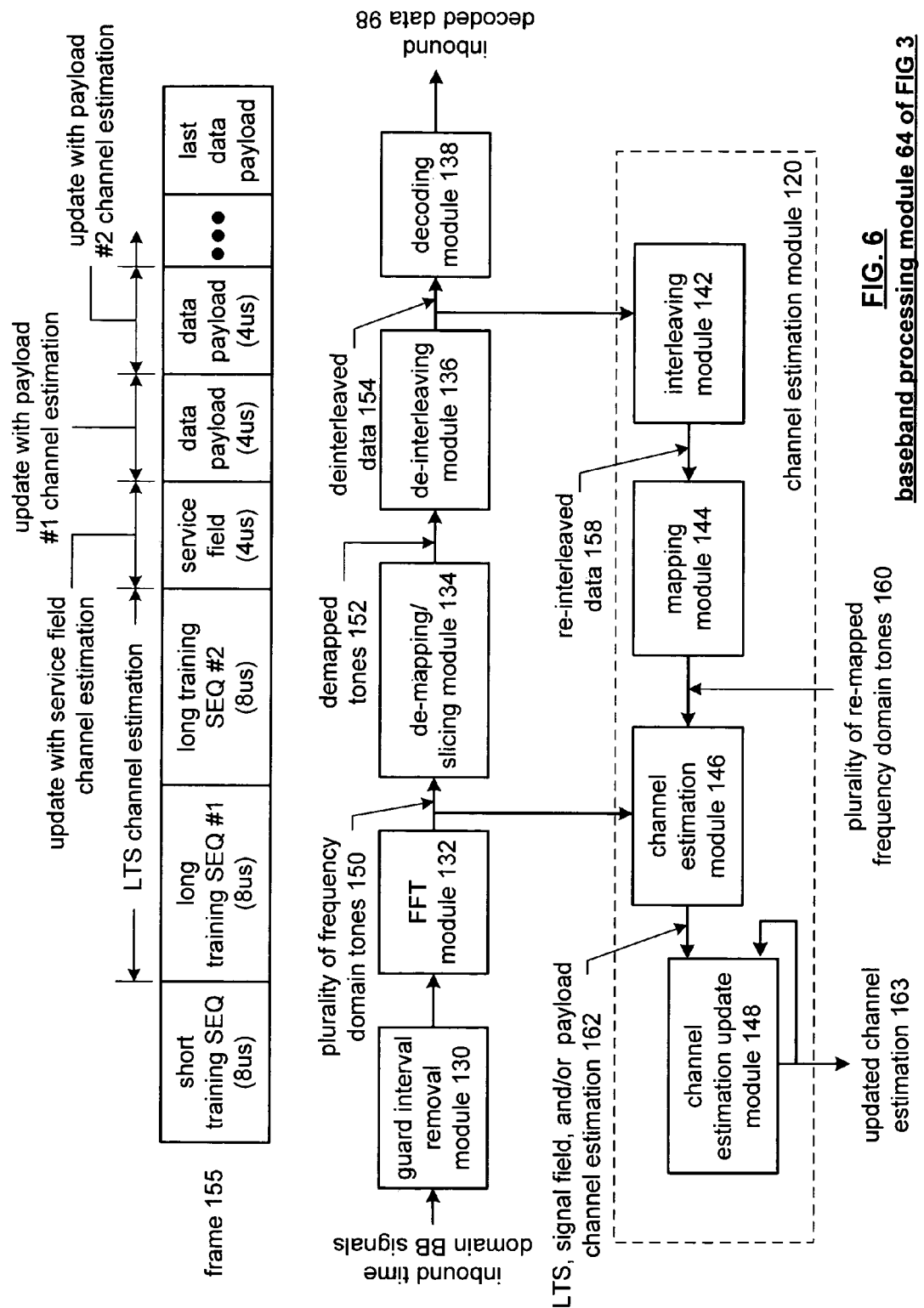
FIG. 6 is a schematic block diagram of another embodiment of the baseband processing module of the wireless communication device of FIG. 3 in accordance with the present invention.

FIG. 6 is an alternate implementation of the baseband processing module 64. In this embodiment the baseband processing module 64 includes the guard interval removal module 130, the FFT module 132, the demapping/slicing module 134, the deinterleaving module 136, the decoding module 138, and the channel estimation module 120. In this embodiment, the channel estimation module 120 includes the interleaving module 142, the mapping module 144, the channel estimation module 146 and the channel estimation update module 148. Modules 130-138 function as previously described with reference to FIG. 5 to convert inbound time domain baseband signals into inbound decoded data 98.

In this embodiment, the channel estimation module 120 receives the deinterleaved data 154 from module 136 via the interleaving module 142. The interleaving module 142 reinterleaves the data to produce reinterleaved data 158. The mapping module 144 maps the reinterleaved data 158 to a plurality of remapped frequency domain tones 160. The channel estimation module 146 and channel estimation update module 148 function as previously described with reference to FIG. 5 to produce the updated channel estimate 163.

Figure 7:
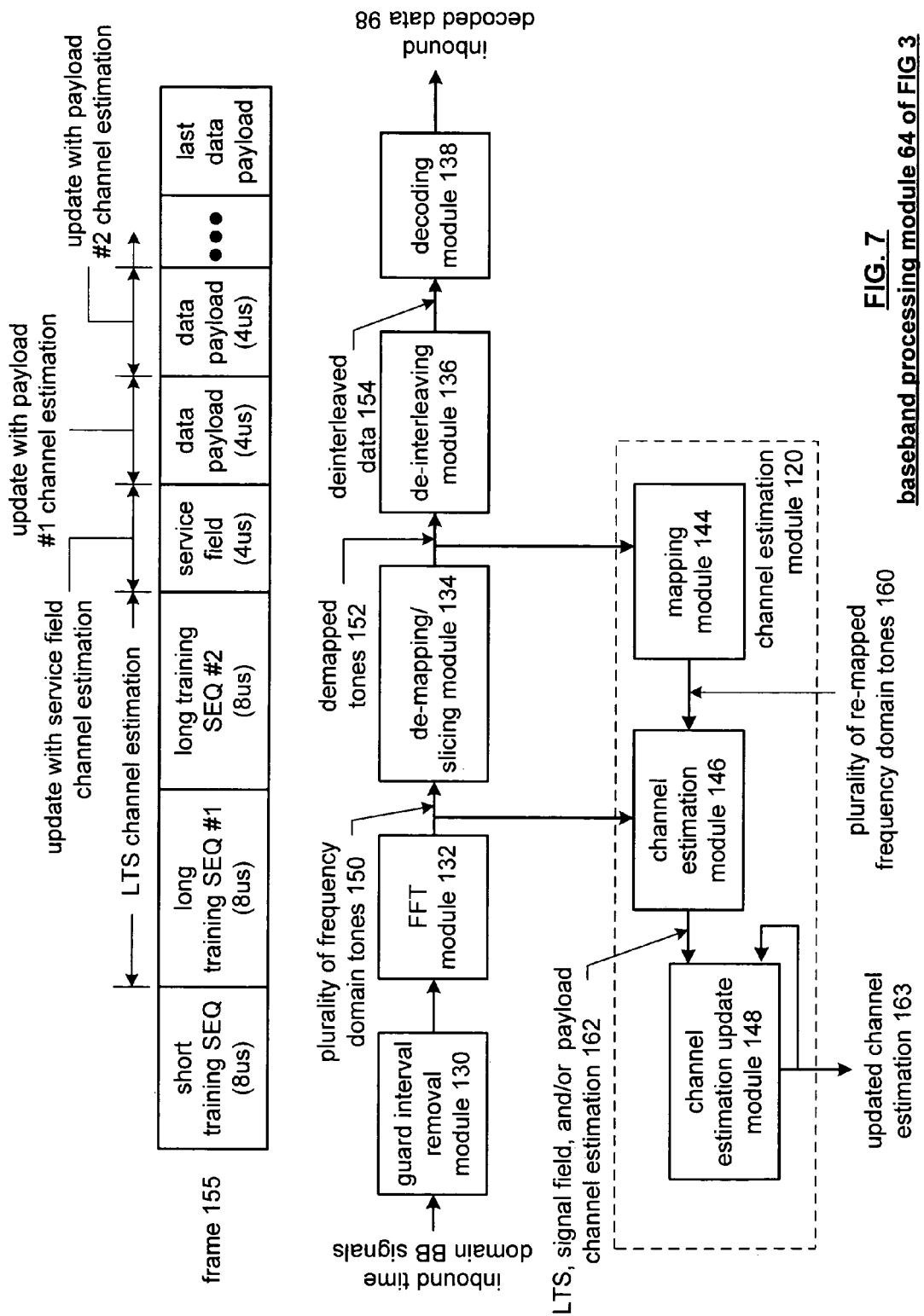
FIG. 7 is a schematic block diagram of yet another embodiment of the baseband processing module of the wireless communication device of FIG. 3 in accordance with the present invention.

FIG. 7 is a schematic block diagram of yet another embodiment of the baseband processing module 64. In this embodiment, the baseband processing module 64 is configured to include the guard interval removal module 130, the FFT module 132, the demapping/slicing module 134, the deinterleaving module 136, the decoded module 138, and the channel estimation module 120. In this embodiment, the channel estimation module 120 includes the mapping module 144, the channel estimation module 146 and the channel estimation update module 148. Modules 130-138 operate as previously described with reference to FIG. 5 to convert inbound time domain baseband signals into inbound decoded data 98.

In this embodiment, the channel estimation module 120 receives the demapped tones 152 via the mapping module 144. The mapping module 144 maps the demapped tones 152 to tones of the OFDM modulation to produce a plurality of remapped frequency domain tones 160. The channel estimation module 146 and channel estimation update module 148 function as previously described with reference to FIG. 5 to produce the updated channel estimation 163.

Figure 8:
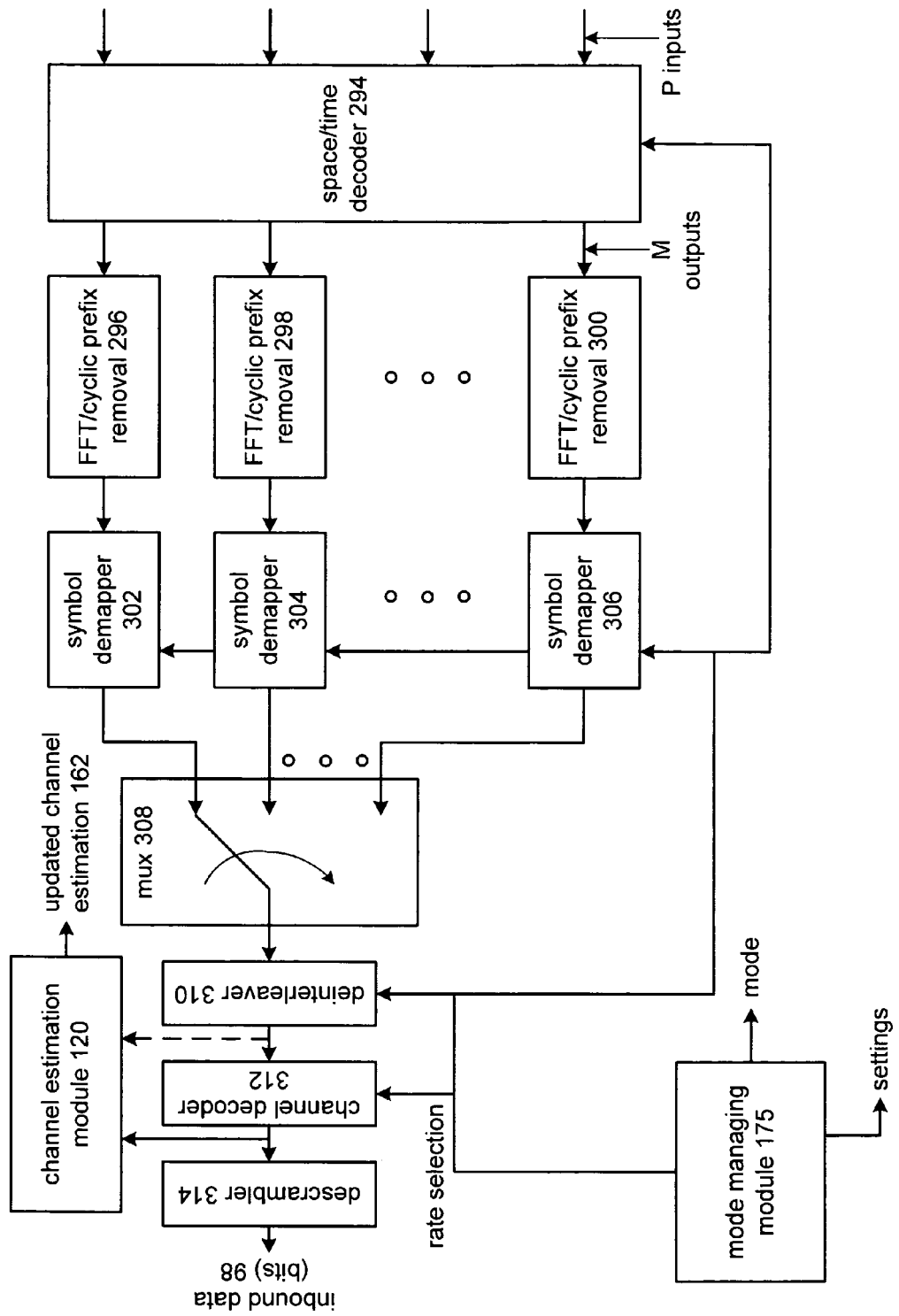
FIG. 8 is a schematic block diagram of an embodiment of the baseband processing module of the wireless communication device of FIG. 2 in accordance with the present invention.

FIG. 8 illustrates the baseband processing of a receiver in accordance with the wireless communication device of FIG. 2. The baseband processing includes a space/time decoder 294, a plurality of fast Fourier transform (FFT)/cyclic prefix removal modules 296-300, a plurality of symbol demapping modules 302-306, a multiplexer 308, a deinterleaver 310, a channel decoder 312, a descramble module 314, and the channel estimation module 120. The baseband processing module may further include a mode managing module 175. The space/time decoding module 294 receives P-inputs from the receiver paths and produces M-output paths. In an embodiment, the space/time decoding module 294 multiples the input symbols of each path with a decoding matrix that has the form of $$\begin{bmatrix} C_1 & C_2 & C_3 & \cdots & C_{2M-1} \\ -C_2^* & C_1^* & C_4 & \cdots & C_{2M} \end{bmatrix}$$

Note that the rows of the decoding matrix correspond to the number of input paths and the columns correspond to the number of output paths. Note that the number of M output paths of the space and time decoding may equal the number of P-input paths of the space and time decoding or the number of input paths P may equal M+1 paths.

The FFT/cyclic prefix removal modules 296-300 converts the M streams of symbols from time domain symbols to frequency domain symbols to produce M streams of frequency domain symbols. In one embodiment, the prefix removal function removals inter-symbol interference based on a prefix. Note that, in general, a 64-point FFT will be used for 20 MHz channels and 128-point FFT will be used for 40 MHz channels.

The symbol demapping modules 302-306 convert the frequency domain symbols into bit streams of data. In an embodiment, each symbol demapping module maps quadrature amplitude modulated QAM symbols (e.g., BPSK, QPSK, 16 QAM, 64 QAM, 256 QAM, et cetera) into a bit stream of data. Note that for IEEE 802.11(a) backward compatibility, double gray coding may be used. The multiplexer 308 combines the demapped symbol streams into a single path. The deinterleaver 310 deinterleaves the single path.

The iterative decoder 312, which is described in greater detail in co-pending patent application entitled WLAN RECEIVER HAVING AN ITERATIVE DECODER having an attorney docket number of BP 3529 and a provisional filing date of Feb. 20, 2004, decodes the deinterleaved data to produce decoded data. The descrambler 314 descrambles the decoded data to produce the inbound data 98. In one embodiment, the descrambler 314 removes (in GF2) a pseudo random sequence from the decoded data. A pseudo random sequence may be generated from a feedback shift register with the generator polynomial of $S(x)=x^7+x^4+1$ to produce scrambled data.

The channel estimation module 120 may be coupled to the output of the deinterleaving module 310 to receive deinterleaved data or it may be coupled to the output of the channel decoder 312 to receive decoded data. If the channel estimation module 120 is coupled to receive the decoded data it functions as previously described with reference to FIG. 5. If the channel estimation module 120 receives the deinterleaved data, it functions as previously described with reference to FIG. 6.

Figure 9:
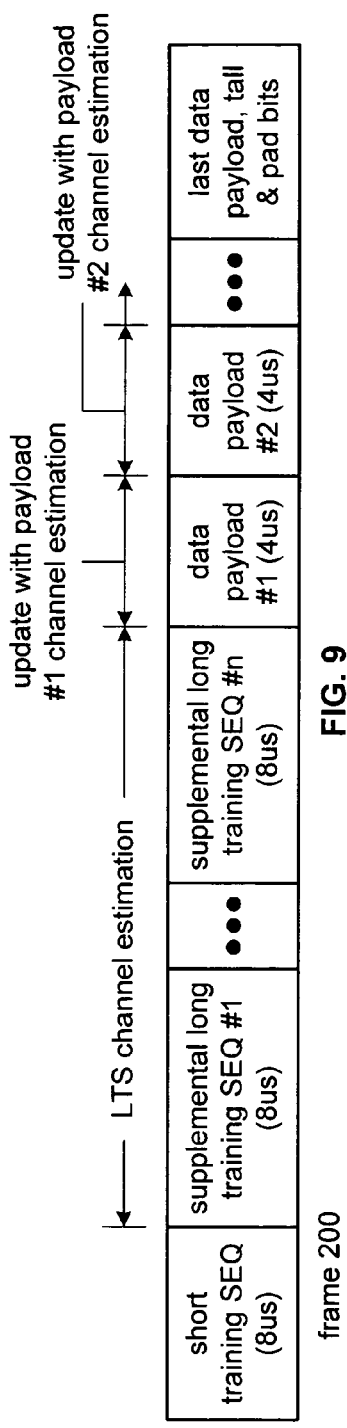
FIGS. 9-11 are diagrams of various frame formats that may be processed by the baseband processing module of FIG. 8.

FIG. 9 illustrates a frame 200 that may be constructed in accordance with IEEE 802.11n when only 802.11n compliant devices are within a proximal area for a wireless communication. As shown, frame 200 includes a short training sequence, a plurality of supplemental long training sequences, and a plurality of data payload sections. For this type of frame, the channel estimation module 120 of FIG. 8 will initially generate the channel estimation based on the LTS channel estimation as previously described with reference to FIG. 5. The channel estimation module 120 will then update the channel estimation for each channel estimation it generates for a data payload section. As shown, the $1^{st}$ data payload has a corresponding channel estimate that is used to update the LTS channel estimate to produce the updated channel estimate. The next data payload has a corresponding channel estimate produced for it and the corresponding channel estimate is used to update the previously updated channel estimate.

Figure 10:
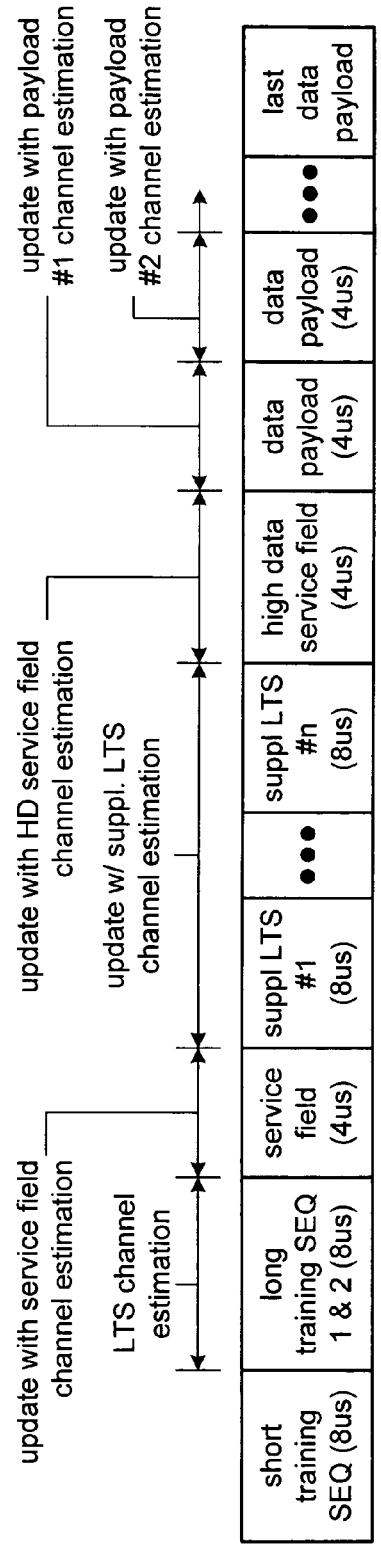

FIG. 10 illustrates a frame 202 that may be in accordance with IEEE 802.11n where the communication area includes 802.11n, 802.11a and/or 802.11g devices. In this instance, the frame 202 includes the short training sequence, long training sequences in accordance with the 802.11a and/or 802.11g standard, a service field in accordance with the 802.11a and/or 802.11g standard, supplemental long training sequences, a high data service field, and a plurality of data payload sections. Frame 202, as illustrated, includes two frame information fields: the service field and the high data service field.

The channel estimation module 120 of FIG. 8 generates the channel estimation by first determining the LTS channel estimation and then updating it with a channel estimation corresponding to the service field. The channel estimation module then determines a channel estimate for the supplemental long training sequences and uses that to update the previously updated channel estimate. The updating of the channel estimate continues for the high data service field and one or more of the data payload fields.

Figure 11:
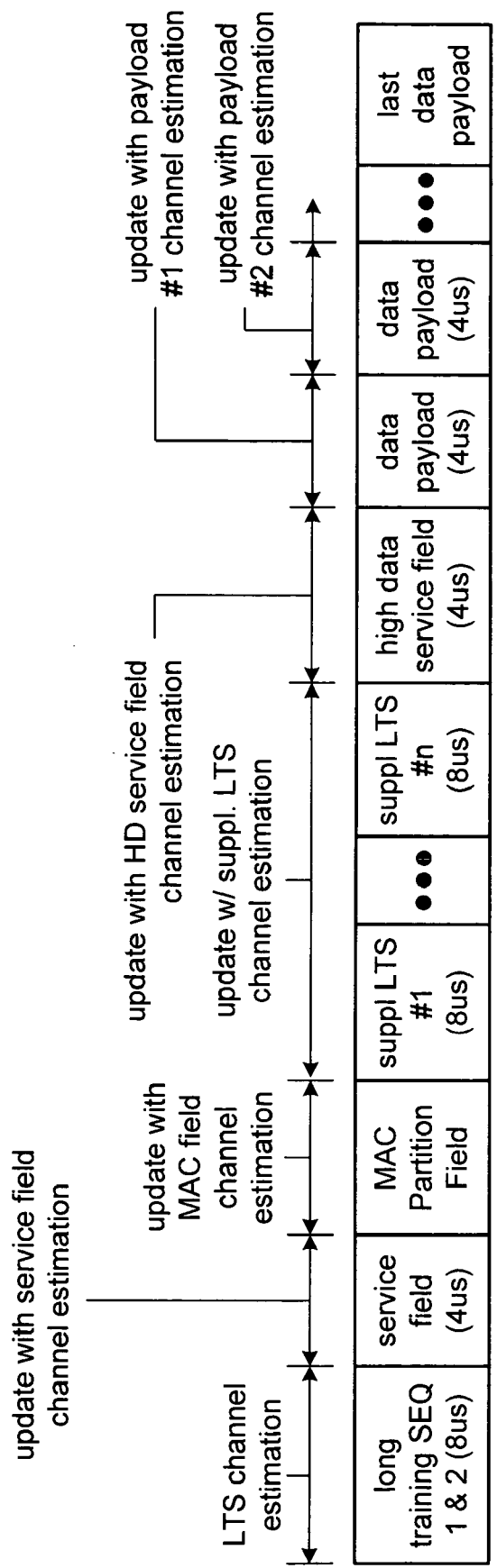

FIG. 11 is another illustration of a frame 204 that may be compliant with IEEE 802.11n for communications that include 802.11n devices, 802.11a devices, 802.11b devices and/or 802.11g devices. In this example, the frame 204 includes a short training sequence (not shown), the legacy long training sequences 1 and 2, the legacy service field, a MAC partitioning field, supplemental long training sequences, the high data service field and a plurality of data payload fields. The channel estimation module 120 of FIG. 8 determines the initial channel estimate by utilizing the LTS channel estimate. The channel estimation module 120 then determines a channel estimate for each field and/or section of frame 204 and uses that channel estimate to update the previously updated channel estimate. In this illustration, frame 204 includes the legacy service field, the MAC partitioning field and the high data service field as frame information sections.

FIG. 12 is a logic diagram of a method performed by the channel estimation module 120 to produce a channel estimation, which is used by the baseband processing module 64 to at least partially produce the inbound decoded data 98. The method begins at step 210 where the channel estimation module determines an initial channel estimation based on the training sequence, wherein for the baseband processing module utilizes the initial channel estimation as the channel estimation until the initial channel estimation is updated. The method continues to step 212 where the channel estimation module determines a channel estimation of a data payload section of the plurality of time sequential data payload sections to produce a payload channel estimation. The method continues at step 214 where the channel estimation module updates the channel estimation based on the payload channel estimation to produce an updated channel estimation, wherein for the baseband processing module utilizes the updated channel estimation as the channel estimation until the updated channel estimation is again updated.

FIG. 13 is a logic diagram of a method for determining the initial channel estimation based on the training sequence of step 210. The method begins at step 216 where the channel estimation module averages a plurality of received long training sequences of the training to produce an average received long training sequence, wherein each of the plurality of received long training sequences $[y_{Li}(t)]$ equals a corresponding transmitted long training sequence $[Li(t)]$ convolved with the channel estimation $[h(t)]$ plus a corresponding noise component $[vi(t)]$. The method continues at step 218 wherein the channel estimation module converts the average received long training sequence from a time domain to a frequency domain to produce a frequency domain average received long training sequence. This may be done by performing a fast Fourier transform function. The method continues at step 220 where the channel estimation module determines the initial channel estimation from the frequency domain average received long training sequence.

For example, $Y_{11}=1_1*h(t)+v_1(t)$, where $Y_{11}$ represents the first received long training sequence, $1_1$ represents the first known long training sequence, $h(t)$ represents the channel estimation, and $v_1(t)$ represents the noise vector of the first long training sequence. Further, $Y_{12}=1_2*h(t)+v_2(t)$, where $Y_{12}$ represents the second received long training sequence, $1_2$ represents the second known long training sequence, $h(t)$ represents the channel estimation, which is assumed to be the same for both LTS, and $v_2(t)$ represents the noise vector of the second long training sequence. The received long training sequences may be averaged where $Y_1(t)=1(t)*h(t)+[v_1(t)+v_2(t)]/2$. This equation is then converted to the frequency domain by performing a fast Fourier transform, which yields $Y_k=L_kH_k+V_k$, where $L_k$ is $+/-1$ and $H_k$ can be estimated. As such, the channel estimation for the LTS $(H_{LTS})=H_k+L_kV_k$.

FIG. 14 is a logic diagram of an alternate method performed by the channel estimation module 120 to produce a channel estimation. The method again begins at step 210 where channel estimation module determines an initial channel estimation based on the training sequence. The method continues at step 224 where the channel estimation module determines a channel estimation of frame information section of the frame to produce a frame information channel estimation. The frame information section may be Medium Access Control (MAC) partitioning field, a service field, and/or a high data service field. The determination of the channel estimation of the frame information section will be described in greater detail with reference to FIGS. 15-17.

The method continues at step 226 where the channel estimation module updates the initial channel estimation based on the frame information channel estimation to produce an updated initial channel estimation. In one embodiment, this may be achieved by combining the frame information channel estimation with the initial channel estimation to produce the updated initial channel estimation. In this embodiment, the combining may be done by averaging the frame information channel estimation with the initial channel estimation to produce the updated initial channel estimation. The averaging includes two symbol averaging, three symbol averaging, and P-symbol averaging, where P is a number greater than 3.

As an example of two symbol averaging, assume $H_{LTRN}$ is the initial channel estimation based on the training sequence, $H_{SIG}$ is the frame information channel estimation, and $H_{AVG}$ is the average channel estimation, then $H_{AVG} = [H_{LTRN} + H_{SIG}]/2$. As an example of three symbol averaging, $H_{AVG} = [H_{LTRN1} + H_{LTRN2} + H_{SIG}]/3$.

The averaging of the frame information channel estimation with the initial channel estimation may further include applying a first weighting factor to the frame information channel estimation and applying a second weighting factor to the initial channel estimation. For example, $H_{AVG} = \frac{3}{4}H_{LTRN} + \frac{1}{4}H_{SIG}$.

The method continues at step 212 where the channel estimation module determines a channel estimation of the data payload section as was previously described with reference to FIG. 12. The method continues at step 228 where the channel estimation module updates the updated channel estimation based on the payload channel estimation to produce a new updated channel estimation. In an embodiment, the updating the channel estimation may be done by combining the payload channel estimation with the initial updated channel estimation to produce the updated channel estimation. In this embodiment, the combining may be done by averaging the payload channel estimation with the updated initial channel estimation to produce the updated channel estimation. The averaging of the payload channel estimation with the updated channel estimation may further include applying a third weighting factor to the payload channel estimation and applying a fourth weighting factor to the updated initial channel estimation.

FIG. 15 is a logic diagram of a method for determining the channel estimation of the frame information section of step 224 of FIG. 14. The method begins at step 230 where the channel estimation module encodes decoded data to produce re-encoded data, wherein the encoding is complimentary to decoding of deinterleaved data performed by the baseband processing module. The method continues at step 232 where the channel estimation module interleaves the re-encoded data to produce re-interleaved data, wherein the interleaving is complimentary to deinterleaving of demapped tones performed by the baseband processing module. The method continues at step 234 where the channel estimation module maps the re-interleaved data into a plurality of re-mapped frequency domain tones, wherein the mapping is complimentary to demapping of a plurality of frequency domain tones performed by the baseband processing module, wherein the time-domain baseband signals are converted into the plurality of frequency domain tones.

The method continues at step 236 where the channel estimation module determines the payload channel estimation based on the plurality of re-mapped frequency domain tones and the plurality of frequency domain tones. This may be done by representing the plurality of frequency domain tones as Y, where Y=Z*H+V, and where Z represents the plurality of re-mapped frequency domain tones, H represents the frame information channel estimation in the frequency domain, V represents noise in the frequency domain of the frame information section, and * represents a convolution. The frame information channel estimation H is then determined by solving Y=Z*H+V for H. The same processing is done to determine each of the payload channel estimations.

Figure 16:
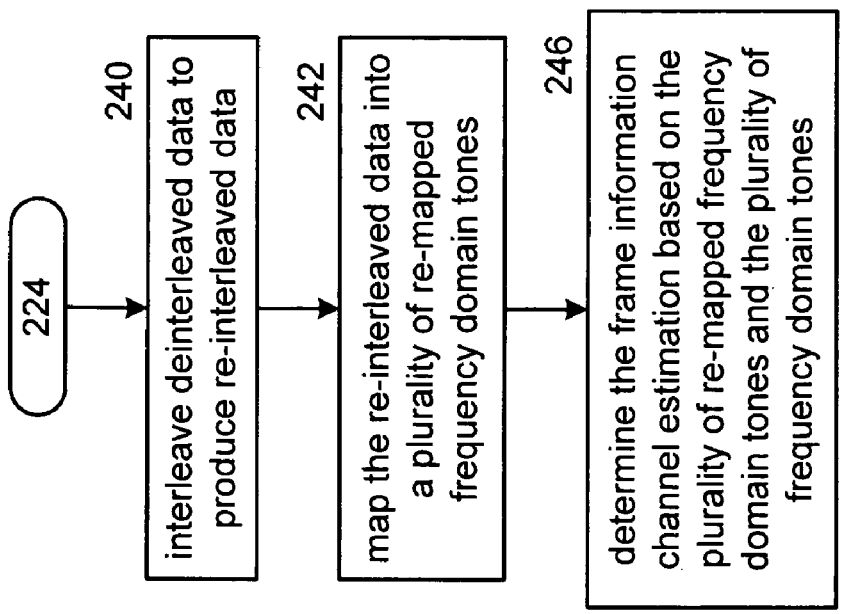
FIG. 16 is a logic diagram of another method of determining a channel estimation of frame information or payload data in accordance with the method of FIG. 14.

FIG. 16 is a logic diagram of another method for determining the channel estimation of the frame information section of step 224 of FIG. 14. The method begins at step 240 where the channel estimation module interleaves the re-encoded data to produce re-interleaved data, wherein the interleaving is complimentary to deinterleaving of demapped tones performed by the baseband processing module. The method continues at step 242 where the channel estimation module maps the re-interleaved data into a plurality of re-mapped frequency domain tones, wherein the mapping is complimentary to demapping of a plurality of frequency domain tones performed by the baseband processing module, wherein the time-domain baseband signals are converted into the plurality of frequency domain tones.

The method continues at step 246 where the channel estimation module determines the payload channel estimation based on the plurality of re-mapped frequency domain tones and the plurality of frequency domain tones. This may be done by representing the plurality of frequency domain tones as Y, where Y=Z*H+V, and where Z represents the plurality of re-mapped frequency domain tones, H represents the frame information channel estimation in the frequency domain, V represents noise in the frequency domain of the frame information section, and * represents a convolution. The frame information channel estimation H is then determined by solving Y=Z*H+V for H. The same processing is done to determine each of the payload channel estimations.

Figure 17:
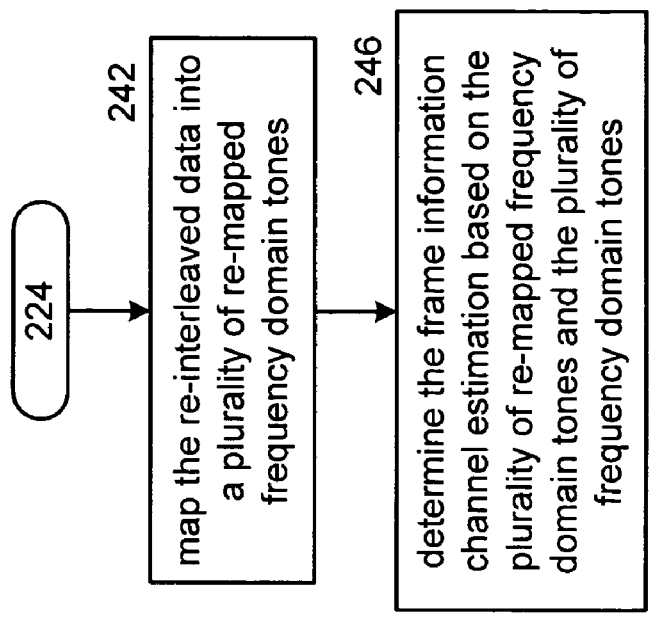
FIG. 17 is a logic diagram of yet another method of determining a channel estimation of frame information or payload data in accordance with the method of FIG. 14.

FIG. 17 is a logic diagram of yet another method for determining the channel estimation of the frame information section of step 224 of FIG. 14. The method begins at step 242 where the channel estimation module maps the re-interleaved data into a plurality of re-mapped frequency domain tones, wherein the mapping is complimentary to demapping of a plurality of frequency domain tones performed by the baseband processing module, wherein the time-domain baseband signals are converted into the plurality of frequency domain tones.

The method continues at step 246 where the channel estimation module determines the payload channel estimation based on the plurality of re-mapped frequency domain tones and the plurality of frequency domain tones. This may be done by representing the plurality of frequency domain tones as Y, where Y=Z*H+V, and where Z represents the plurality of re-mapped frequency domain tones, H represents the frame information channel estimation in the frequency domain, V represents noise in the frequency domain of the frame information section, and * represents a convolution. The frame information channel estimation H is then determined by solving Y=Z*H+V for H. The same processing is done to determine each of the payload channel estimations.

FIG. 18 is a logic diagram of a method performed by the channel estimation module to determine the channel estimation of the data payload section as in step 212 of FIGS. 12 and 14. The method begins at step 250 where the channel estimation module determines, in sequential order, a corresponding channel estimation for each of the plurality of time sequential data payload sections to produce a plurality of corresponding channel estimations. The method continues at step 252 where the channel estimation module combines, in sequential order, a current one of the plurality of corresponding channel estimations with the updated channel estimation to produce a new updated channel estimation. For example, the updating may be done as $H_{AVGupdate}=[H_{AVGprevious}+H_{Di}]/2$, where $H_{AVGupdate}$ is the new updated channel estimation, $H_{AVGprevious}$ is the updated channel estimation and $H_{Di}$ is the channel estimation of the current data payload section. As another example, the updating may be done as $H_{AVGupdate}=[H_{AVGprevious1}+H_{AVGprevious2}+H_{Di}]/3$.

FIG. 19 is a logic diagram of a method performed by the channel estimation module to determine the channel estimation of the data payload section as in step 212 of FIGS. 12 and 14. The method begins at step 254 where the channel estimation module determines a corresponding channel estimation for selected ones of the plurality of time sequential data payload sections to produce a plurality of corresponding channel estimations. In one embodiment, the channel estimation module determines the selected ones of the plurality of time sequential data payload sections based on signal strength and/or predetermined selection order. The method continues at step 256 where the channel estimation module combines a current one of the plurality of corresponding channel estimations with the updated channel estimation to produce a new updated channel estimation.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for updating a channel estimation based on payload of a frame. As one of average skill in the art will appreciate, other embodiments may be derived from the present discussion without deviating from the scope of the claims.

What is claimed is:

1. A method for payload-based channel estimation of a wireless channel, the method comprises:

receiving a frame via the wireless communication channel, wherein the frame includes a training sequence, a frame information section, and a plurality of time sequential data payload sections, wherein, in time, the training sequence precedes at least a portion of the frame information section, and the frame information section precedes the plurality of time sequential data payload sections;

as the frame is being received:

determining a channel estimation based on the training sequence;

determining a channel estimation of the frame information section to produce a frame information channel estimation;

determining a channel estimation of a data payload section of the plurality of time sequential data payload sections to produce a payload channel estimation;

averaging the frame information channel estimation with the channel estimation to produce an initial updated channel estimation; and averaging the payload channel estimation with the initial updated channel estimation to produce an updated channel estimation.

2. The method of claim 1, wherein the determining the channel estimation based on the training sequence comprises:

receiving the frame as radio frequency (RF) signals to produce received RF signals, wherein the received RF signals are represented as y(t), wherein the training sequence includes a plurality of received long training sequences;

averaging the plurality of received long training sequences to produce an average received long training sequence, wherein each of the plurality of received long training sequences $[y_{Li}(t)]$ equals a corresponding transmitted long training sequence $[Li(t)]$ convolved with the channel estimation $[h(t)]$ plus a corresponding noise component;

converting the average received long training sequence from a time domain to a frequency domain to produce a frequency domain average received long training sequence; and determining the channel estimation from the frequency domain average received long training sequence.

3. The method of claim 1, wherein the determining the channel estimation of the frame information section comprises:

receiving the frame information section as radio frequency (RF) signals;

converting the RF signals into time-domain baseband signals;

converting the time-domain baseband signals into a plurality of frequency domain tones;

demapping the plurality of frequency domain tones to produce demapped tones;

deinterleaving the demapped tones to produce deinterleaved data;

decoding the deinterleaved data to produce decoded data;
encoding the decoded data to produce re-encoded data, wherein the encoding is complimentary to the decoding;
interleaving the re-encoded data to produce re-interleaved data, wherein the interleaving is complimentary to the deinterleaving;
mapping the re-interleaved data into a plurality of re-mapped frequency domain tones; and
determining the frame information channel estimation based on the plurality of re-mapped frequency domain tones and the plurality of frequency domain tones.

4. The method of claim 1, wherein the determining the frame information channel estimation comprises:
representing the plurality of frequency domain tones as Y, where Y=Z*H+V, and where Z represents the plurality of re-mapped frequency domain tones, H represents the frame information channel estimation in the frequency domain, V represents noise in the frequency domain of the frame information section, and * represents a convolution; and
solving Y=Z*H+V to determine the frame information channel estimation H.

5. The method of claim 1, wherein the determining the channel estimation of the frame information section comprises:
receiving the frame information section as radio frequency (RF) signals;
converting the RF signals into time-domain baseband signals;
converting the time-domain baseband signals into a plurality of frequency domain tones;
demapping the plurality of frequency domain tones to produce demapped tones;
deinterleaving the demapped tones to produce deinterleaved data;
decoding the deinterleaved data to produce decoded data;
interleaving the deinterleaved data to produce re-interleaved data, wherein the interleaving is complimentary to the deinterleaving;
mapping the re-interleaved data into a plurality of re-mapped frequency domain tones; and
determining the frame information channel estimation based on the plurality of re-mapped frequency domain tones and the plurality of frequency domain tones.

6. The method of claim 1, wherein the determining the channel estimation of the frame information section comprises:
receiving the frame information section as radio frequency (RF) signals;
converting the RF signals into time-domain baseband signals;
converting the time-domain baseband signals into a plurality of frequency domain tones;
demapping the plurality of frequency domain tones to produce demapped tones;
deinterleaving the demapped tones to produce deinterleaved data;
decoding the deinterleaved data to produce decoded data;
mapping the plurality of frequency domain tones into a plurality of re-mapped frequency domain tones; and
determining the frame information channel estimation based on the plurality of re-mapped frequency domain tones and the plurality of frequency domain tones.

7. The method of claim 1, wherein the average of the frame information channel estimation with the channel estimation and the averaging the payload channel estimation with the initial updated channel comprises at least one of:
two symbol averaging;
three symbol averaging; and
P-symbol averaging.

8. The method of claim 1, wherein the average of the frame information channel estimation with the channel estimation and the averaging the payload channel estimation with the initial updated channel comprises:
applying a first weighting factor to the frame information channel estimation;
applying a second weighting factor to the channel estimation;
applying a third weighting factor to the payload channel estimation;
applying a fourth weighting factor to the initial updated channel estimation.

9. The method of claim 1 further comprises:
in sequential order:
determining a corresponding channel estimation for each of the plurality of time sequential data payload sections to produce a plurality of corresponding channel estimations; and
combining a current one of the plurality of corresponding channel estimations with the updated channel estimation to produce a new updated channel estimation.

10. The method of claim 1 further comprises:
determining a corresponding channel estimation for selected ones of the plurality of time sequential data payload sections to produce a plurality of corresponding channel estimations; and
combining a current one of the plurality of corresponding channel estimations with the updated channel estimation to produce a new updated channel estimation.

11. The method of claim 10 comprises:
determining the selected ones of the plurality of time sequential data payload sections based on at least one of: signal strength and predetermined selection order.

12. The method of claim 1, wherein the frame information section comprises at least one of:
Medium Access Control (MAC) partitioning field;
a service field; and
a high data service field.

13. The method of claim 1, wherein the determining of the payload channel estimation comprises:
receiving the data payload section as radio frequency (RF) signals;
converting the RF signals into time-domain baseband signals;
converting the time-domain baseband signals into a plurality of frequency domain tones;
demapping the plurality of frequency domain tones to produce demapped tones;
deinterleaving the demapped tones to produce deinterleaved data;
decoding the deinterleaved data to produce decoded data;
encoding the decoded data to produce re-encoded data, wherein the encoding is complimentary to the decoding;
interleaving the re-encoded data to produce re-interleaved data, wherein the interleaving is complimentary to the deinterleaving;
mapping the re-interleaved data into a plurality of re-mapped frequency domain tones; and determining the payload channel estimation based on the plurality of re-mapped frequency domain tones and the plurality of frequency domain tones.

14. The method of claim 13, wherein the determining the payload channel estimation comprises:
representing the plurality of frequency domain tones as Y, where Y=Z*H+V, and where Z represents the plurality of re-mapped frequency domain tones, H represents the frame information channel estimation in the frequency domain, V represents noise in the frequency domain of the frame information section, and * represents a convolution; and
solving Y=Z*H+V to determine the frame information channel estimation H.

15. The method of claim 1, wherein the determining of the payload channel estimation comprises:
receiving the data payload section as radio frequency (RF) signals;
converting the RF signals into time-domain baseband signals;
converting the time-domain baseband signals into a plurality of frequency domain tones;
demapping the plurality of frequency domain tones to produce demapped tones;
deinterleaving the demapped tones to produce deinterleaved data;
decoding the deinterleaved data to produce decoded data;
interleaving the deinterleaved data to produce re-interleaved data, wherein the interleaving is complimentary to the deinterleaving;
mapping the re-interleaved data into a plurality of re-mapped frequency domain tones; and
determining the payload channel estimation based on the plurality of re-mapped frequency domain tones and the plurality of frequency domain tones.

16. The method of claim 1, wherein the determining of the payload channel estimation comprises:
receiving the data payload section as radio frequency (RF) signals;
converting the RF signals into time-domain baseband signals;
converting the time-domain baseband signals into a plurality of frequency domain tones;
demapping the plurality of frequency domain tones to produce demapped tones;
deinterleaving the demapped tones to produce deinterleaved data;
decoding the deinterleaved data to produce decoded data;
mapping the plurality of frequency domain tones into a plurality of re-mapped frequency domain tones; and
determining the frame information channel estimation based on the plurality of re-mapped frequency domain tones and the plurality of frequency domain tones.

17. A wireless local area network (WLAN) receiver comprises:
a radio frequency (RF) receiver section operably to convert inbound RF signals into time domain baseband signals, wherein the inbound RF signals represent at least one frame, wherein the frame includes a training sequence, a frame information section, and a plurality of time sequential data payload sections, wherein, in time, the training sequence precedes at least a portion of the frame information section and the frame information section precedes the plurality of time sequential data payload sections;

baseband processing module operably coupled to convert the time domain baseband signals into decoded data based on a channel estimation; and
a channel estimation module operably coupled to, as the frame is being received:
determine an initial channel estimation based on the training sequence, wherein for the baseband processing module utilizes the initial channel estimation as the channel estimation until the initial channel estimation is updated;
determine a channel estimation of the frame information section to produce a frame information channel estimation;
determine a channel estimation of a data payload section of the plurality of time sequential data payload sections to produce a payload channel estimation;
averaging the frame information channel estimation with the initial channel estimation to produce an updated initial channel estimation; and
averaging the payload channel estimation with the updated initial channel estimation to produce the updated channel estimation, wherein the baseband processing module utilizes the updated channel estimation as the channel estimation until the updated channel estimation is again updated.

18. The WLAN receiver of claim 17, wherein the determining the initial channel estimation based on the training sequence comprises:
averaging a plurality of received long training sequences of the training to produce an average received long training sequence, wherein each of the plurality of received long training sequences [$y_{Li}(t)$] equals a corresponding transmitted long training sequence [Li(t)] convolved with the channel estimation [h(t)] plus a corresponding noise component [vi(t)];
converting the average received long training sequence from a time domain to a frequency domain to produce a frequency domain average received long training sequence; and
determining the initial channel estimation from the frequency domain average received long training sequence.

19. The WLAN receiver of claim 17, wherein the determining the channel estimation of the frame information section comprises:
encoding the decoded data to produce re-encoded data, wherein the encoding is complimentary to decoding of deinterleaved data performed by the baseband processing module;
interleaving the re-encoded data to produce re-interleaved data, wherein the interleaving is complimentary to deinterleaving of demapped tones performed by the baseband processing module;
mapping the re-interleaved data into a plurality of re-mapped frequency domain tones, wherein the mapping is complimentary to demapping of a plurality of frequency domain tones performed by the baseband processing module, wherein the time-domain baseband signals are convened into the plurality of frequency domain tones; and
determining the frame information channel estimation based on the plurality of re-mapped frequency domain tones and the plurality of frequency domain tones.

20. The WLAN receiver of claim 19, wherein the determining the frame information channel estimation comprises:

representing the plurality of frequency domain tones as Y, where Y=Z*H+V, and where Z represents the plurality of re-mapped frequency domain tones, H represents the frame information channel estimation in the frequency domain, V represents noise in the frequency domain of the frame information section, and * represents a convolution; and solving Y=Z*H+V to determine the frame information channel estimation H.

21. The WLAN receiver of claim 17, wherein the determining the channel estimation of the frame information section comprises:
    interleaving deinterleaved data to produce re-interleaved data, wherein the interleaving is complimentary to deinterleaving of demapped tones performed by the baseband processing module;
    mapping the re-interleaved data into a plurality of re-mapped frequency domain tones, wherein the mapping is complimentary to demapping of a plurality of frequency domain tones performed by the baseband processing module, wherein the time-domain baseband signals are converted into the plurality of frequency domain tones; and
    determining the frame information channel estimation based on the plurality of re-mapped frequency domain tones and the plurality of frequency domain tones.

22. The WLAN receiver of claim 17, wherein the determining the channel estimation of the frame information section comprises:
    mapping the plurality of frequency domain tones into a plurality of re-mapped frequency domain tones, wherein the mapping is complimentary to demapping of a plurality of frequency domain tones performed by the baseband processing module, wherein the time-domain baseband signals are converted into the plurality of frequency domain tones; and
    determining the frame information channel estimation based on the plurality of re-mapped frequency domain tones and the plurality of frequency domain tones.

23. The WLAN receiver of claim 17, wherein the average of the frame information channel estimation with the initial channel estimation and the averaging the payload channel estimation with the updated initial channel comprises at least one of:
    two symbol averaging;
    three symbol averaging; and
    P-symbol averaging.

24. The WLAN receiver of claim 17, wherein the average of the frame information channel estimation with the initial channel estimation and the averaging the payload channel estimation with the updated initial channel comprises:
    applying a first weighting factor to the frame information channel estimation;
    applying a second weighting factor to the initial channel estimation;
    applying a third weighting factor to the payload channel estimation;
    applying a fourth weighting factor to the updated initial channel estimation.

25. The WLAN receiver of claim 17, wherein the channel estimation module further functions to:
    in sequential order:
        determine a corresponding channel estimation for each of the plurality of time sequential data payload sections to produce a plurality of corresponding channel estimations; and
        combine a current one of the plurality of corresponding channel estimations with the updated channel estimation to produce a new updated channel estimation.

26. The WLAN receiver of claim 17, wherein the channel estimation module further functions to:
    determine a corresponding channel estimation for selected ones of the plurality of time sequential data payload sections to produce a plurality of corresponding channel estimations; and
    combine a current one of the plurality of corresponding channel estimations with the updated channel estimation to produce a new updated channel estimation.

27. The WLAN receiver of claim 26, wherein the channel estimation module further functions to:
    determine the selected ones of the plurality of time sequential data payload sections based on at least one of: signal strength and predetermined selection order.

28. The WLAN receiver of claim 17, wherein the frame information section comprises at least one of:
    Medium Access Control (MAC) partitioning field;
    a service field; and
    a high data service field.

29. The WLAN receiver of claim 17, wherein the determining of the payload channel estimation comprises:
    encoding decoded data to produce re-encoded data, wherein the encoding is complimentary to decoding of deinterleaved data performed by the baseband processing module;
    interleaving the re-encoded data to produce re-interleaved data, wherein the interleaving is complimentary to deinterleaving of demapped tones performed by the baseband processing module;
    mapping the re-interleaved data into a plurality of re-mapped frequency domain tones, wherein
    the mapping is complimentary to demapping of a plurality of frequency domain tones performed by the baseband processing module, wherein the time-domain baseband signals are converted into the plurality of frequency domain tones; and
    determining the payload channel estimation based on the plurality of re-mapped frequency domain tones and the plurality of frequency domain tones.

30. The WLAN receiver of claim 29, wherein the determining the payload channel estimation comprises:
    representing the plurality of frequency domain tones as Y, where Y=Z*H+V, and where Z represents the plurality of re-mapped frequency domain tones, H represents the frame information channel estimation in the frequency domain, V represents noise in the frequency domain of the frame information section, and * represents a convolution; and
    solving Y=Z*H+V to determine the frame information channel estimation H.

31. The WLAN receiver of claim 17, wherein the determining of the payload channel estimation comprises:
    interleaving the deinterleaved data to produce re-interleaved data, wherein the interleaving is complimentary to deinterleaving of demapped tones performed by the baseband processing module;
    mapping the re-interleaved data into a plurality of re-mapped frequency domain tones, wherein the mapping is complimentary to demapping of a plurality of frequency domain tones performed by the baseband processing module, wherein the time-domain baseband signals are converted into the plurality of frequency domain tones; and determining the payload channel estimation based on the plurality of re-mapped frequency domain tones and the plurality of frequency domain tones.

32. The WLAN receiver of claim 17, wherein the determining of the payload channel estimation comprises:
mapping the plurality of frequency domain tones into a plurality of re-mapped frequency domain tones, wherein the mapping is complimentary to demapping of a plurality of frequency domain tones performed by the baseband processing module, wherein the time-domain baseband signals are converted into the plurality of frequency domain tones; and
determining the frame information channel estimation based on the plurality of re-mapped frequency domain tones and the plurality of frequency domain tones.

33. A method for payload-based channel estimation of a wireless channel, the method comprises:
receiving a frame via the wireless communication channel, wherein the frame includes a training sequence, a frame information section, and a plurality of time sequential data payload sections, wherein, in time, the training sequence precedes at least a portion of the frame information section, and the frame information section precedes the plurality of time sequential data payload sections;
as the frame is being received:
determining a channel estimation based on the training sequence;
determining a channel estimation of the frame information section to produce a frame information channel estimation;
upon determining the frame information channel estimation, combining the frame information channel estimation with the channel estimation to produce an updated channel estimation;
determining a corresponding channel estimation for selected ones of the plurality of time sequential data payload sections to produce a plurality of corresponding channel estimations, wherein the determining the selected ones of the plurality of time sequential data payload sections is based on at least one of: signal strength and predetermined selection order; and
combining a current one of the plurality of corresponding channel estimations with the updated channel estimation to produce a new updated channel estimation.

34. A wireless local area network (WLAN) receiver comprises:
a radio frequency (RF) receiver section operably to convert inbound RF signals into time domain baseband signals, wherein the inbound RF signals represent at least one frame, wherein the frame includes a training sequence, a frame information section, and a plurality of time sequential data payload sections, wherein, in time, the training sequence precedes at least a portion of the frame information section and the frame information section precedes the plurality of time sequential data payload sections;
baseband processing module operably coupled to convert the time domain baseband signals into decoded data based on a channel estimation;
a channel estimation module operably coupled to, as the frame is being received:
determine an initial channel estimation based on the training sequence, wherein the baseband processing module utilizes the initial channel estimation as the channel estimation until the initial channel estimation is updated;
determine a channel estimation of the frame information section to produce a frame information channel estimation;
update the initial channel estimation based on the frame information channel estimation to produce an updated initial channel estimation;
determine a corresponding channel estimation for selected ones of the plurality of time sequential data payload sections to produce a plurality of corresponding channel estimations, wherein the selected ones of the plurality of time sequential data payload sections are determined based on at least one of: signal strength and predetermined selection order; and
combine a current one of the plurality of corresponding channel estimations with the updated channel estimation to produce a new updated channel estimation, wherein the baseband processing module utilizes the new updated channel estimation as the channel estimation until the updated channel estimation is again updated.

* * * * *

UNITED STATES PATENT AND TRADEMARK OFFICE
CERTIFICATE OF CORRECTION

| | | |
|---|---|---|
| PATENT NO. | : 7,346,129 B2 | Page 1 of 1 |
| APPLICATION NO. | : 10/856080 | |
| DATED | : March 18, 2008 | |
| INVENTOR(S) | : Rohit V. Gaikwad | |

It is certified that error appears in the above-identified patent and that said Letters Patent is hereby corrected as shown below:

Column 22, line 61, in Claim 19: replace "convened" with --converted--.

Signed and Sealed this

Third Day of March, 2009

JOHN DOLL
*Acting Director of the United States Patent and Trademark Office*